US012559151B2

(12) United States Patent
Newell

(10) Patent No.: US 12,559,151 B2
(45) Date of Patent: Feb. 24, 2026

(54) ADJUSTABLE DISPLACED DIFFERENTIAL DRIVE SYSTEM

(71) Applicant: Gregory James Newell, Cascais (PT)

(72) Inventor: Gregory James Newell, Cascais (PT)

( * ) Notice: Subject to any disclaimer, the term of this patent is extended or adjusted under 35 U.S.C. 154(b) by 0 days.

(21) Appl. No.: 18/814,912

(22) Filed: Aug. 26, 2024

(65) Prior Publication Data

US 2024/0416982 A1     Dec. 19, 2024

Related U.S. Application Data

(63) Continuation of application No. 18/634,261, filed on Apr. 12, 2024.

(60) Provisional application No. 63/458,950, filed on Apr. 13, 2023.

(51) Int. Cl.
B62B 3/00          (2006.01)
B62B 3/06          (2006.01)
B62B 5/00          (2006.01)

(52) U.S. Cl.
CPC ............ B62B 3/001 (2013.01); B62B 3/0612 (2013.01); B62B 5/0066 (2013.01)

(58) Field of Classification Search
CPC ...... B62B 3/001; B62B 3/0612; B62B 5/0066
See application file for complete search history.

(56) References Cited

U.S. PATENT DOCUMENTS

| | | | | |
|---|---|---|---|---|
| 2,834,605 A | * | 5/1958 | Mccollough ............. | B62D 7/02 280/47.11 |
| 3,031,024 A | * | 4/1962 | Ulinski ............... | B66F 9/07568 74/498 |
| 3,040,827 A | * | 6/1962 | Ulinski .............. | G05G 9/04785 200/6 A |
| 3,337,231 A | * | 8/1967 | Ronald .................... | B62D 7/02 180/409 |

(Continued)

FOREIGN PATENT DOCUMENTS

| | | |
|---|---|---|
| DE | 202004020742 U1 | 12/2005 |
| DE | 102011086109 A1 | 5/2013 |

(Continued)

OTHER PUBLICATIONS

International Search Report and Written Opinion issued in App. No. PCT/IB2024/053632, dated Jul. 23, 2024, 18 pages.

*Primary Examiner* — Valentin Neacsu
*Assistant Examiner* — Michael R Stabley
(74) *Attorney, Agent, or Firm* — Riverside Law LLP

(57)          ABSTRACT

An adjustable displaced differential (ADD) drive unit is disclosed. The ADD drive unit includes a first drive wheel connected to a first pivot and having a vertical axis that is offset laterally from the first wheel traction point. The ADD drive unit includes a second drive wheel connected to a second pivot having a vertical axis that is offset laterally from the second wheel traction point. The ADD drive unit includes differential steering, where if the speed of rotation of the first drive wheel is different to the speed of rotation of (Continued)

the second drive wheel, steering results. The ADD drive unit includes an adjustable steering assembly that can adjust the orientation of the first drive wheel as compared to the second drive wheel to provide additional driving modalities including Ackermann steering, steerable lateral travel and steerable rotation about a chosen vertical axis, such as the center of the machine.

24 Claims, 21 Drawing Sheets

(56) References Cited

U.S. PATENT DOCUMENTS

| | | | | |
|---|---|---|---|---|
| 3,938,608 A * | 2/1976 | Folco-Zambelli | .... | B62B 5/0026 |
| | | | | 280/47.11 |
| 4,257,619 A * | 3/1981 | Fisher | ...................... | B62D 7/04 |
| | | | | 280/91.1 |
| 4,932,489 A * | 6/1990 | Evans | .................. | B62D 7/1509 |
| | | | | 180/7.1 |
| 5,752,710 A * | 5/1998 | Roberts | .................. | A61G 5/046 |
| | | | | 180/408 |
| 5,758,371 A * | 6/1998 | VanDyke | ............. | A61G 7/1092 |
| | | | | 74/498 |
| 8,590,664 B2 * | 11/2013 | Terashima | ........... | B60K 7/0007 |
| | | | | 180/6.5 |
| 11,130,519 B1 * | 9/2021 | Cui | ...................... | B66F 9/07568 |
| 11,414,128 B1 * | 8/2022 | Cui | ........................ | B62D 7/026 |
| 2005/0236208 A1 * | 10/2005 | Runkles | ............... | B60K 17/303 |
| | | | | 180/254 |
| 2020/0317256 A1 * | 10/2020 | Hao | ........................ | B62D 7/18 |

FOREIGN PATENT DOCUMENTS

| | | | | |
|---|---|---|---|---|
| DE | 102016201227 A1 | | 8/2017 | |
| DE | 102017222334 A1 * | | 6/2019 | |
| DE | 102017222336 A1 | | 6/2019 | |
| DE | 102018222232 A1 | | 6/2020 | |
| EP | 1028086 A2 * | | 8/2000 | .......... B62D 5/0418 |
| WO | 2020110334 A1 | | 6/2020 | |

* cited by examiner

ADJUSTABLE DISPLACED DIFFERENTIAL DRIVE SYSTEM

CROSS-REFERENCE TO RELATED APPLICATIONS

This application is a continuation of U.S. patent application Ser. No. 18/634,261, filed Apr. 12, 2024, now pending, which claims priority to U.S. patent application No. 63/458,950, filed Apr. 13, 2023, the contents of which are incorporated herein by reference in their entirety.

BACKGROUND

Conventional robotically controlled machines typically utilize one of two approaches to address driving, traction, and steering to move a load. One approach includes a platform-style system, whereas a second approach includes an "A-frame" style system that typically has two forks.

Platform-style systems generally include two wheels, one mounted on each side of the machine. Driving both wheels in the same direction moves the machine forward or backward, and driving one wheel faster than the other wheel causes the machine to turn. Further, moving the wheels in opposite directions at the same speed allows the machine to rotate in place. This driving and steering method is commonly referred to as a differential, and while there are other variations on this differential format, this simplest configuration is the most common. Generally, to move an object, such as a pallet, the platform-style machine travels under a fixed platform and lifts its deck to lift the pallet off the fixed platform. Once the machine moves clear of the fixed platform, the machine typically lowers its deck to a more stable height and transports the object to another fixed platform. Although these platform-style machines are able to rotate about their center while carrying a load, and thus maneuver in narrower aisleways, these machines have their disadvantages too. For instance, the drive wheels of the machine may provide lateral stability, however, additional stability wheels are required at the front and back of the machine for stability in that direction also which generally results in some rocking of the machine forward and/or backward as the machine accelerates, decelerates, or travels over uneven floors. Further, pallets have traditionally been moved by machines that can lift the pallets from floor level and return the pallets to floor level after arriving at their next destination. Thus, to utilize these platform-style systems, a facility needs to design systems and include additional infrastructure in order for a platform-style system to travel underneath a pallet and lift/place the pallet onto a fixed platform.

A-frame style systems typically include two forks having wheels that are small enough such that the forks and wheels can travel into the cavity of the pallet. The forks can then be raised to lift a pallet off the floor for transportation and lowered again to any location on the floor afterward. These fork wheels are typically non-steering due to height and load limitations and are always aligned in the direction of the respective fork. The drive unit of the A-frame style system is generally housed in a structure (i.e., the "A-frame") adjacent to where the forks support a pallet. A typical drive unit includes steerable drive wheels that have two precisely controlled axes of motion, one for traction to move the system, and the other for steering to change a direction of travel of the system. The A-frame structure is typically built vertically to reduce the overall system footprint and thus make it more maneuverable. However, the drive unit is generally more complex and expensive than a differential drive unit. For instance, a traction unit for the A-frame style system needs to be twice as powerful as the traction units for a differential drive system as the tractive force of each differential is combined when moving in one direction. Moreover, a single-wheel steerable drive unit requires an additional drive motor, gearing and control system to be able to provide that steering function.

Further, as the A-frame system typically includes non-steerable wheels in the forks and a single steerable drive wheel in the A-frame, this tricycle kinematic system has several function limitations. For example, the system is not inherently stable particularly when turning or when moving without a load. To address the stability concerns, stability wheels are mounted to both sides of the steerable drive wheel and are set above the height of the drive wheel to avoid the driven wheel from being lifted off the ground when encountering a low spot in the floor. Given this layout, some "rocking" of the system from side-to-side typically can occur, due to the inertia of the system as it moves and further due to uneven flooring. The rocking may adversely affect the operation of some sensors, and in particular, lidars and cameras used for localization and navigation. Additionally, the system is typically perceived as being unstable due to the wobbling as it drives. Moreover, a tricycle kinematic system typically offers limited maneuverability in tight spaces, cannot move laterally, and cannot rotate about its own center. Some A-frame systems may include a differential drive approach in which two driven wheels are housed in a rotatable housing that allows steering without the need for a separately controlled steering system. However, as this differential drive unit still needs to pivot to ensure both driven wheels are always in contact with the ground, the same limitations as for the single steerable drive wheel exist so that such an A-frame system is still inherently unstable and offers limited maneuverability.

Thus, there is a need in the art for improved drive systems. The present invention satisfies this need.

SUMMARY

The present disclosure relates generally to drive systems, and more particularly, to adjustable displaced differential drive systems.

In one or more aspects, the disclosed technology relates to a displaced differential drive unit. In one or more cases, the displaced differential drive unit includes a first drive wheel having a traction point. In one or more cases, the first wheel is connected to a first pivot having a vertical axis that is offset laterally from the first wheel traction point. In one or more cases, the displaced differential drive unit includes a second drive wheel having a traction point. In one or more cases, the second wheel is connected to a second pivot having a vertical axis that is offset laterally from the second wheel traction point. In one or more cases, the displaced differential drive unit includes a first pulley coupled to the first pivot and coaxially aligned with the first pivot vertical axis. In one or more cases, the differential drive unit includes a second pulley coupled to the second pivot and coaxially aligned with the second pivot vertical axis. In one or more cases, the displaced differential drive unit includes a belt engaged with and connecting the first pulley and the second pulley.

In one or more aspects, the disclosed technology relates to an adjustable differential drive (ADD) unit. In one or more cases, the ADD unit includes a first drive wheel having a traction point. In one or more cases, the first wheel is connected to a first pivot having a vertical axis that is offset laterally from the first wheel traction point. In one or more cases, the ADD unit includes a second drive wheel having a traction point. In one or more cases, the second wheel is connected to a second pivot having a vertical axis that is offset laterally from the second wheel traction point. In one or more cases, the ADD unit includes a first pulley coupled to the first pivot and coaxially aligned with the first pivot vertical axis. In one or more cases, the ADD unit includes a second pulley coupled to the second pivot and coaxially aligned with the second pivot vertical axis. In one or more cases, the ADD unit includes a third pulley. In one or more cases, the position of the third pulley relative to the first pulley or second pulley is adjustable. In one or more cases, the ADD unit includes a belt engaged with and connecting the first pulley, the second pulley, and the third pulley.

In one or more aspects, the disclosed technology relates to an adjustable differential drive (ADD) unit. In one or more cases, the ADD unit includes a first drive wheel having a traction point. In one or more cases, the first wheel is connected to a first pivot having a vertical axis that is offset laterally from the first wheel traction point. In one or more cases, the ADD unit includes a second drive wheel having a traction point. In one or more cases, the second wheel is connected to a second pivot having a vertical axis that is offset laterally from the second wheel traction point. In one or more cases, the ADD unit includes a first rotational actuator coupled to the first pivot and coaxially aligned with the first pivot vertical axis. In one or more cases, the ADD unit includes a second rotational actuator coupled to the second pivot and coaxially aligned with the second pivot vertical axis. In one or more cases, the ADD unit includes a steering assembly connecting the first rotational actuator and second rotational actuator to orient at least one of the first drive wheel and the second drive wheel to provide Ackermann steering. In one or more cases, the first rotational actuator comprises a first pulley, the second rotational actuator comprises a second pulley, and the steering assembly comprises an adjustable pulley assembly engaged with a belt that connects the first pulley, the second pulley, and the adjustable pulley assembly. In one or more cases, the first rotational actuator comprises a first gear, and the second rotational actuator comprises a second gear, and the steering assembly comprises an adjusting gearbox and motor, in which the adjusting gearbox is operably coupled with the first gear via a first pulley or at least one gear and is operably coupled with the second gear via a second pulley or at least one other gear. In one or more cases, the first drive wheel and the second drive wheel are oriented based on an amount of rotation and a direction of rotation of the adjusting gearbox.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description.

FIG. 3F illustrates an isometric view of an example linkage and guide assemblies.

DETAILED DESCRIPTION

Figure 1A:
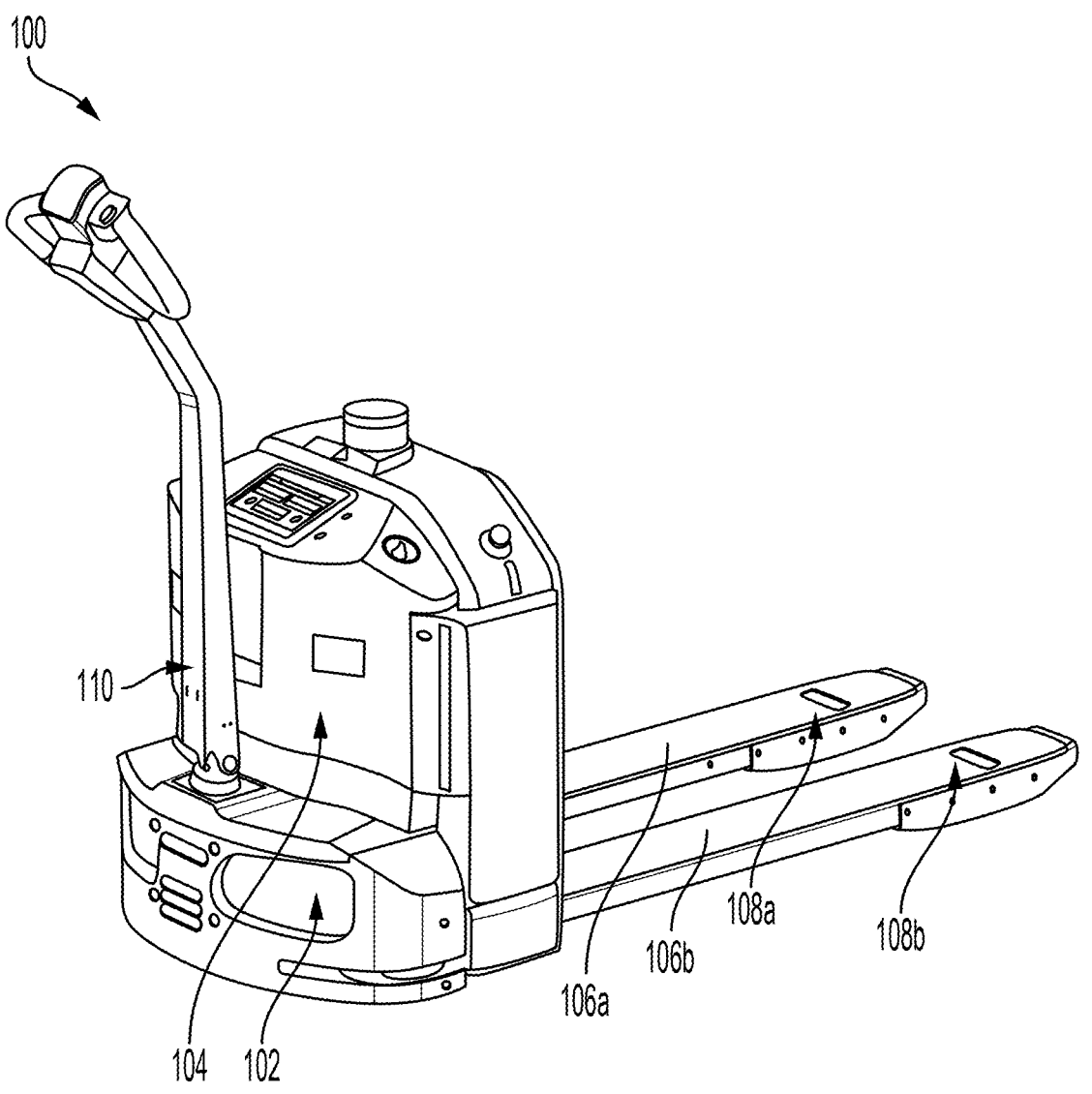
FIG. 1A illustrates an isometric view of an A-frame style of pallet moving machine.

The following discussion omits or only briefly describes conventional features of drive systems that are apparent to those skilled in the art. It is noted that various embodiments are described in detail with reference to the drawings, in which like reference numerals represent like parts and assemblies throughout the several views. Reference to various embodiments or examples does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations.

Unless otherwise specifically defined herein, all terms are to be given their broadest reasonable interpretation including meanings implied from the specification as well as meanings understood by those skilled in the art and/or as defined in dictionaries, treatises, etc. It is noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof.

Relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively or operably connected" is such an attachment, coupling or connection that allows the pertinent structures to operate as intended by virtue of that relationship.

Reference throughout the specification to "one embodiment", "an embodiment" or "some embodiments" means that a particular feature, structure, or characteristic described in connection with an embodiment is included in at least one embodiment of the subject matter disclosed. Thus, the appearance of the phrases "in one embodiment", "in an embodiment" or "in some embodiments" in various places throughout the specification is not necessarily referring to the same embodiment. Further, the particular features, structures or characteristics of "one embodiment", "an embodiment" or "some embodiments" may be combined in any suitable manner with each other to form additional embodiments of such combinations. It is intended that embodiments of the disclosed subject matter cover modifications and variations thereof. Terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Moreover, throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range. As used herein, the term "about" in reference to a measurable value, such as an amount, a temporal duration, and the like, is meant to encompass variations of plus or minus 20%, plus or minus 10%, plus or minus 5%, plus or minus 1%, and plus or minus 0.1% of the specified value, as such variations are appropriate.

The term "pulley" as used herein refers to any type of pulley (e.g., a toothed pulley, a flat pulley, etc.), gear, sprocket, and the like, and thus each such term may be used interchangeably. The term "belt" as used herein refers to a flexible connection used to transfer motion between pulleys. The term "belt" refers to any type of belt (e.g., timing belt), chain, and the like, and thus each such term may be used interchangeably. The term "encoder" as used herein refers to any type of sensor used or configured to detect and provide electrical feedback that indicates a position, direction, speed, counts, and/or orientation of a component of the systems described herein.

Conventional material handling systems, such as pallet moving machines, have their drawbacks and are inherently limited. For example, typical handling systems require additional stability wheels to prevent the system from rocking forward and/or backward as the system accelerates, decelerates, or travels over uneven floors. In some cases, the stability wheels are set above the height of a drive wheel to avoid the driven wheel from being lifted off the ground when encountering a low spot in the floor. However, as this layout allows for some rocking of the system, the rocking may adversely affect the operation of some sensors, and in particular, lidars and cameras used for localization and navigation. In another example, platform-style systems generally require complex facilities in order for the platform-style system to travel underneath a pallet and lift/place the pallet onto a fixed platform. In yet another example, tricycle kinematic systems only offer limited maneuverability in tight spaces, cannot move laterally, and cannot rotate about its own center.

The displaced and adjustable displaced differential drive system examples described herein provide increased stability and maneuverability in tight spaces. Moreover, the examples described herein provide lateral movement and rotation about a center of the adjustable displaced differential drive system. For instance, the examples described herein provide lateral movement and rotation about a center of the adjustable displaced differential drive system, in which wheels are positioned at the opposing end of in the forks. Examples of the disclosed displaced and adjustable displaced differential drive systems are described below with reference to the Figures.

Figure 1B:
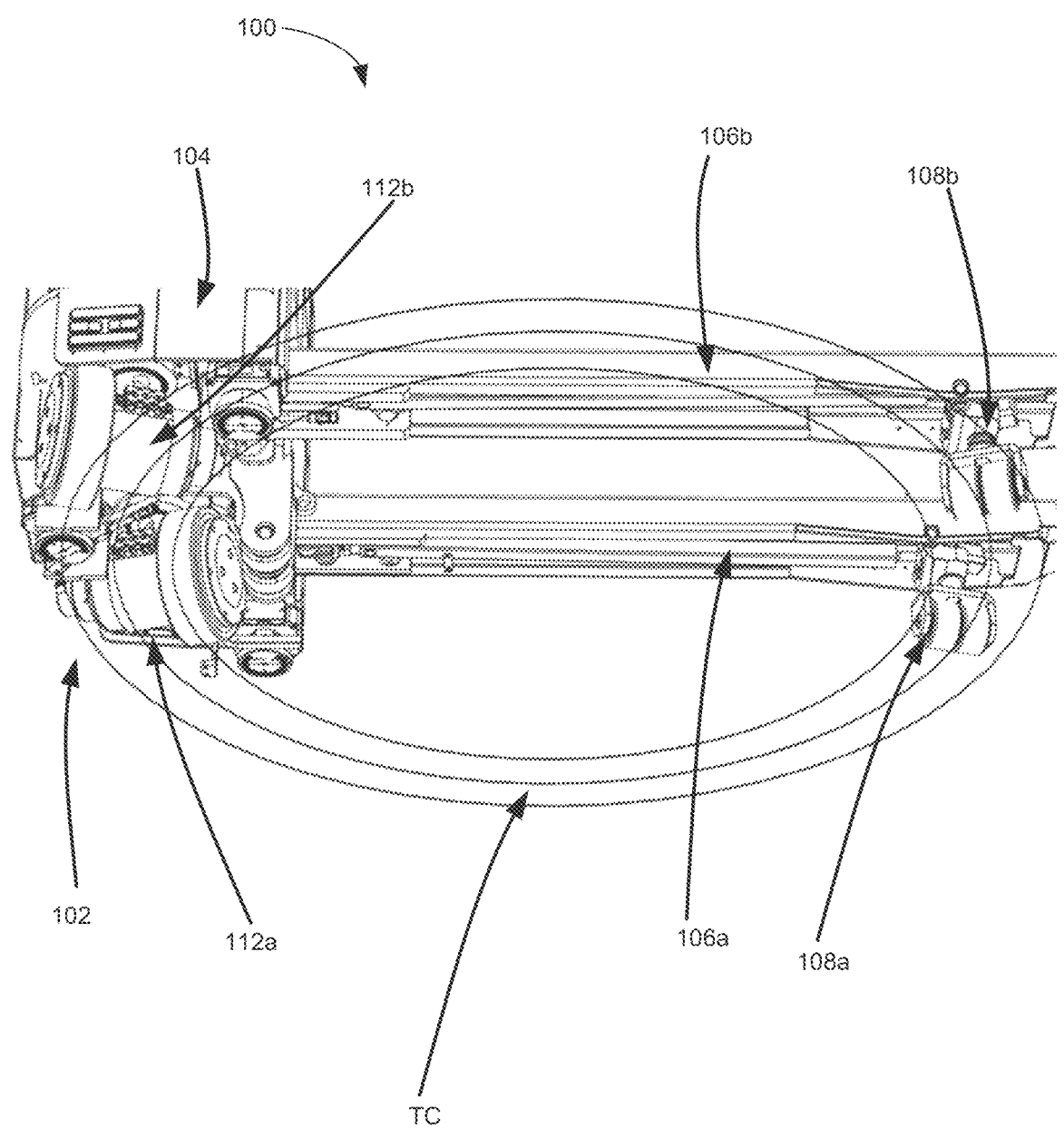
FIG. 1B illustrates a bottom view of the pallet moving machine.

FIG. 1A illustrates an example pallet moving machine (hereinafter "machine 100"). In one or more cases, the machine 100 is configured to operate entirely autonomously. In one or more other cases, one or more portions of the machine 100 are configured to operate manually and one or more other portions of the machine 100 are configured to operate via one or more computer systems, such as, but not limited to, computer system 710 of FIG. 7. In one or more cases, the machine 100 may include a housing, such as the A-frame 104, that typically houses one or more of the electronic(s), the computing/control system(s) and one or more batteries, and below the A-frame 104 the drive assembly 102. The A-frame 104 and drive assembly 102 may be operably coupled to forks 106a and 106b. The forks 106a and 106b may each include a wheel, such as wheels 108a and 108b, respectively. The wheels 108a, 108b may be disposed on the distal end portions of the forks 106a and 106b. For example, wheels 108a, 108b may be located 60% or about 60% down the length of the forks 106a, 106b. The position of the wheels 108a, 108b along the length of the forks 106a, 106b corresponds to a diameter of a turning circle TC of the machine 100, as illustrated in FIG. 1B. In some cases, the wheels 108a, 108b are configured to pivot about their respective vertical axes (as illustrated in FIG. 1B), such that the direction (i.e., the heading of each wheel 108a and 108b) of the wheels 108a, 108b change based on the pivot of the respective wheel 108a and 108b . . . . In other cases, the wheels 108a, 108b remain in a fixed direction (i.e., non-steerable), such that the wheels 108a, 108b do not circumferentially pivot about their respective vertical axes The height of the forks 106a, 106b and wheels 108a, 108b may be sized to travel into a cavity, such as, but not limited to, a cavity of a pallet. The machine 100 may be configured such that the forks 106a, 106b raise upwards and downwards to move objects, such as a pallet. In some cases, the machine 100 optionally includes a handle 110 operably coupled to the drive assembly 102. The handle 110 may be utilized as a steering mechanism for an operator to control the speed and direction of movement of the machine 100.

Although FIG. 1A illustrates that the drive assembly 102 being functionally coupled with the machine 100 in order to control the movement of the machine 100, it should be understood that the drive assembly 102, as well as the other drive assemblies, such as the displaced differential drive system 200, and the displaced differential drive system 300, described herein, may be employed in other systems to drive and steer the respective system. For example, the drive assembly 102, as well as the other drive assemblies, such as the displaced differential drive system 200, and the displaced differential drive system 300, described herein, may be employed in systems, such as, but not limited to, towing or trailer equipment, floor scrubbing machines, shopping cart pushing machines, and other like machines configured to move loads and/or in tight spaces. Further, although the examples described herein relate to one of the drive assembly 102, the displaced differential drive system 200, or the displaced differential drive system 300 positioned on one end of the machine 100, it should be understood that embodiments are contemplated in which multiple drive assemblies and/or differential drive systems are employed in a machine. For example, for machines configured to transport heavier loads (e.g., large paper rolls, cable reels, steel parts in manufacture, heavy machinery manufacture or assembly), multiple drive assemblies and/or differential drive systems may be operably coupled to the machine to provide increased maneuverability, torque, and load support. For instance, a machine configured to transport cable reels may include four adjustable differential drive systems on four areas of the machine to provide maneuverability in all directions.

Figure 2:
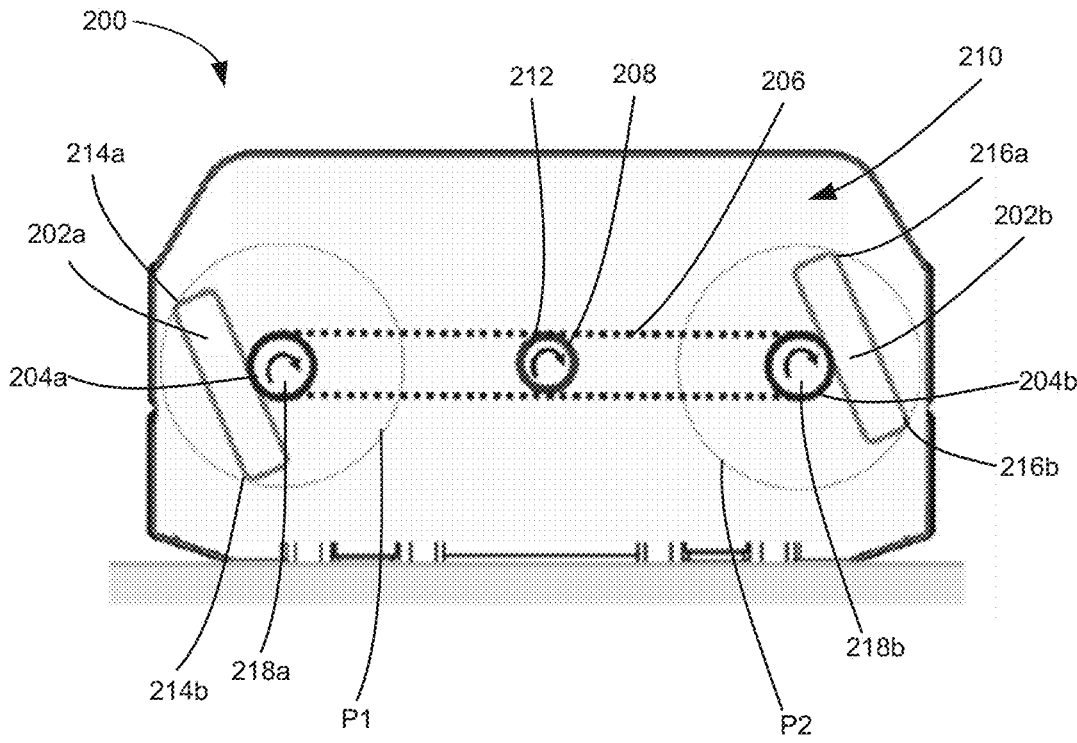
FIG. 2 illustrates a top view of an example displaced differential drive system.

FIG. 2 illustrates a top view of an example displaced differential drive system 200 (hereinafter "system 200"). The system 200 includes drive wheels 202a and 202b and pulleys 218a and 218b coupled to a frame 210 via respective pivots 204a and 204b. The pulley 218a may be coupled to the drive wheel 202a via pivot 204a. The pulley 218a may be coupled to the pivot 204a and is coaxially aligned with a vertical axis of the pivot 204a. The vertical axis of the pivot 204a must be offset laterally from the traction point where the drive wheel 202a contacts the ground. The pulley 218b may be coupled to the drive wheel 202b via pivot 204b. The pulley 218b may be coupled to the pivot 204b and is coaxially aligned with a vertical axis of the pivot 204b. The vertical axis of the pivot 204b must be offset laterally from the traction point where the drive wheel 202b contacts the ground. The pulleys 218a and 218b may each be configured to rotate the respective drive wheels 202a and 202b about the vertical axis of the respective pivots 204a and 204b. For example, pulley 218a may rotate drive wheel 202a about the vertical axis of the pivot 204a, reorienting the drive wheel 202a according to the desired direction of travel. In another example, pulley 218b may rotate drive wheel 202b about the vertical axis of the pivot 204b, reorienting the drive wheel 202b according to the desired direction of travel. The system 200 may be configured as a displaced differential drive system. In some cases, a pivot 208 and pulley 212 may be operably coupled to the belt 206. The pulley 212 may be configured at the pivot 208, or in any other position between (and including) pulleys 218a and 218b, with an encoder to provide the feedback to a control system as to the angular orientation is of the drive wheels 202a and 202b. Both drive wheels 202a and 202b will always remain parallel to one another in this simple, displaced, differential drive assembly.

Drive wheels 202a and 202b may each be configured to rotate forward or backward with a given force resulting in a given travel velocity. Each drive wheel 202a and 202b may be displace a distance from the pivot 208 (i.e., a central location between pivots 204a and 204b), such that the distance from the pivot 208 to a drive wheel is the "moment" M for the traction force generated when turning the system 200. That is, each drive wheel 202a, 202b may have its own independent moment that corresponds to the orientation of the drive wheel (e.g., a distance between a traction point of a drive wheel and the pivot 208). The system 200 is less susceptible to turning, and thus, more inclined to drive in a straight direction, the shorter the moment M. As the moment M distance increases, the differential increases between the velocities of drive wheels 202a and 202b, thereby creating more rotational force at the pivot 208 and increasing the steering sensitivity. In one or more cases, the tendency to turn may be intentional, for example, when one drive wheel rotates at a higher rotation per minute (RPM) than the other drive wheel. In one or more other cases, the tendency to turn may be unintentional, for example, when one drive wheel hits a small obstacle or encounters a floor imperfection.

A traction point of a drive wheel may include the location where the drive wheel contacts the ground. In one or more cases, the traction point is offset laterally from the vertical axis of the respective pivot and/or pulley. By operably coupling the pulleys 218a and 218b via belt 206, the orientation of the pulleys 218a and 218b, and thus, the drive wheels 202a and 202b, may be controlled to steer the system 200. For example, the drive wheels 202a and 202b may each be configured to rotate 360 degrees or radially about the vertical axis of the pivot. For instance, drive wheel 202a may rotate about the vertical axis of the pivot 204a, as the drive wheel 202a changes its angular orientation relative to the frame 210 that the drive wheel 202a is mounted in. In another instance, drive wheel 202b may rotate about the vertical axis of the pivot 204b, such that the drive wheel 202b changes its angular orientation relative to the frame 210 that the drive wheel 202b is mounted in. The difference in RPM of each drive wheel 202a and 202b may result in a drive wheel rotating about the vertical axis of the respective pulleys 218a, 218b. For the cases in which each of the drive wheels 202a, 202b rotate at the same RPM, the moments of each drive wheels 202a, 202b cancel each other such that the system 200 travels in a straight direction. For the cases in which one drive wheel rotates at a higher RPM than the other drive wheel, both drive wheels will turn towards the drive wheel rotating at the lower RPM. That is, the drive forces will mostly cancel each other, and any residual, multiplied by the moment, define the turning force for both drive wheels together, and thus a steering direction of the system 200. For the cases in which one drive wheel rotates at the same RPM but in an opposite direction as the rotation of the other drive wheel, the system 200 may not move any significant amount on the floor. Rather, the two drive wheels may turn or reorient left or right.

In one or more cases, an encoder may be coupled to one or more of the pulleys and/or pivots. For example, an encoder may be coupled to pulley 212. In one or more cases, an encoder may be coupled to each of the pulleys 218a, 218b, and 212, and/or pivots 204a, 204b, and 208. The encoder may be configured to provide an indication as to the direction (i.e., the angle) of travel of the system 200. In some cases, the encoder may continuously provide the direction indication. The encoder may be, for example, but not limited to, a safety rated incremental encoder (e.g., SICK DFS60S Pro incremental encoder). In other cases, the encoder may intermittently provide the direction indication.

As the drive wheels 202a and 202b are positioned on opposite sides of the frame 210 (e.g., an A-frame), the system 200 provides increased stability when incorporated as a drive assembly into a material handling system, such as machine 100. The positioning of the drive wheels 202a and 202b eliminates the need for stability castors that are required on either or both sides of a center drive wheel as in conventional systems. Further, as the positioning of the drive wheels 202a and 202b provide two stable points of contact on the ground on both sides of the system 200, wobbling of the machine 100 is eliminated. Moreover, by being able to change the moment M and having the drive wheels offset from the vertical axis from which they rotate, the steering sensitivity of the drive wheels 202a and 202b may be increased or decreased based on the size and design of the machine 100, the loads being moved, floor condition, or other applications for which the system 200 is being used.

Figure 3A:
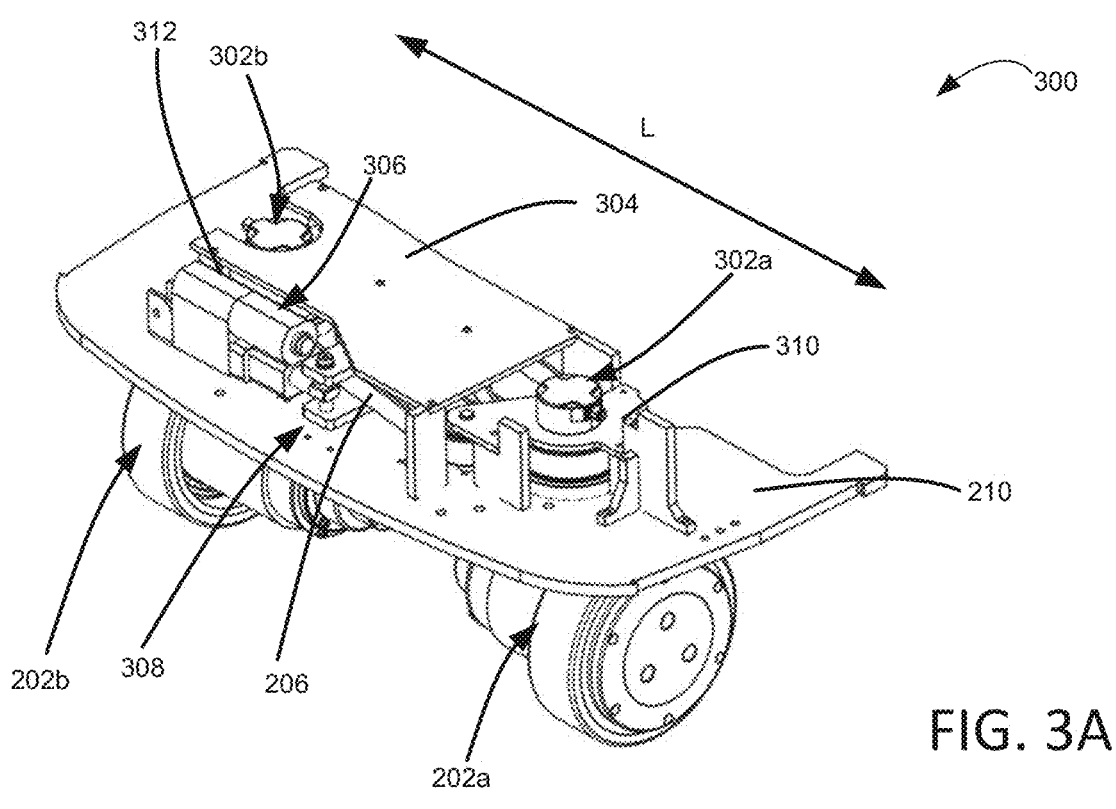
FIG. 3A illustrates an isometric view of an example adjustable displaced differential drive system.
Figure 3B:
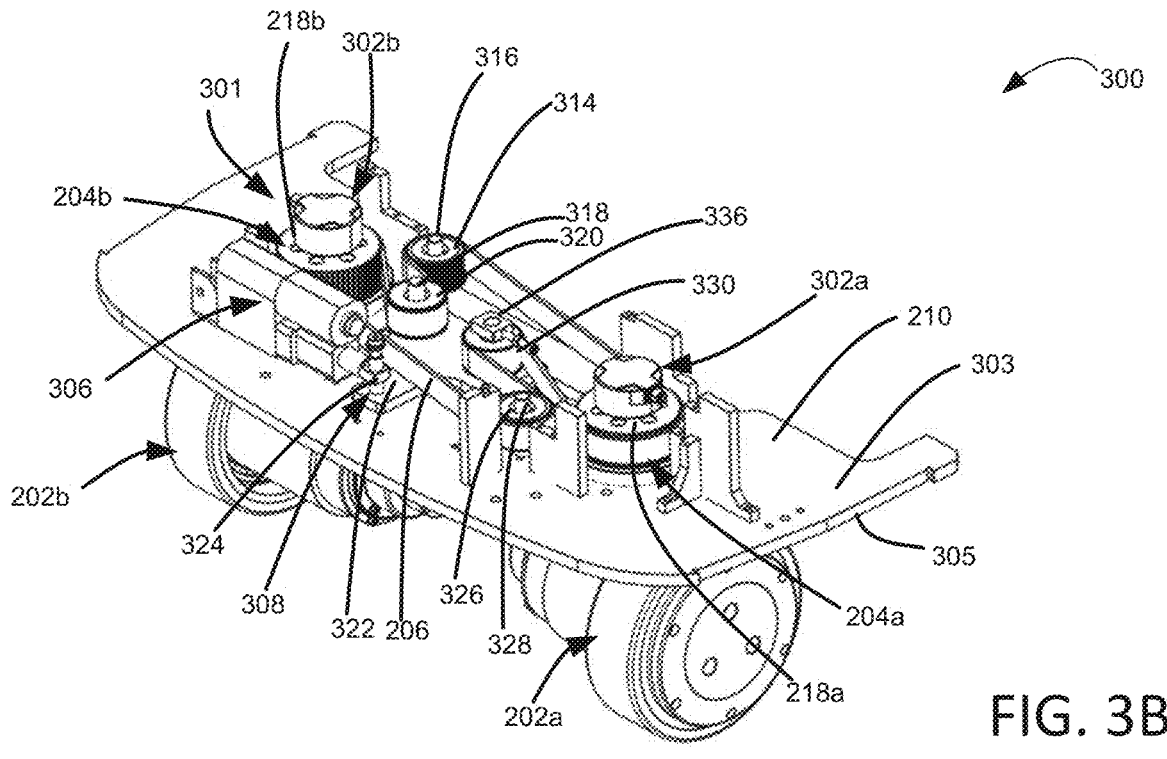
FIG. 3B illustrates an example displaced differential steering assembly of the example adjustable displaced differential drive system.
Figure 3C:
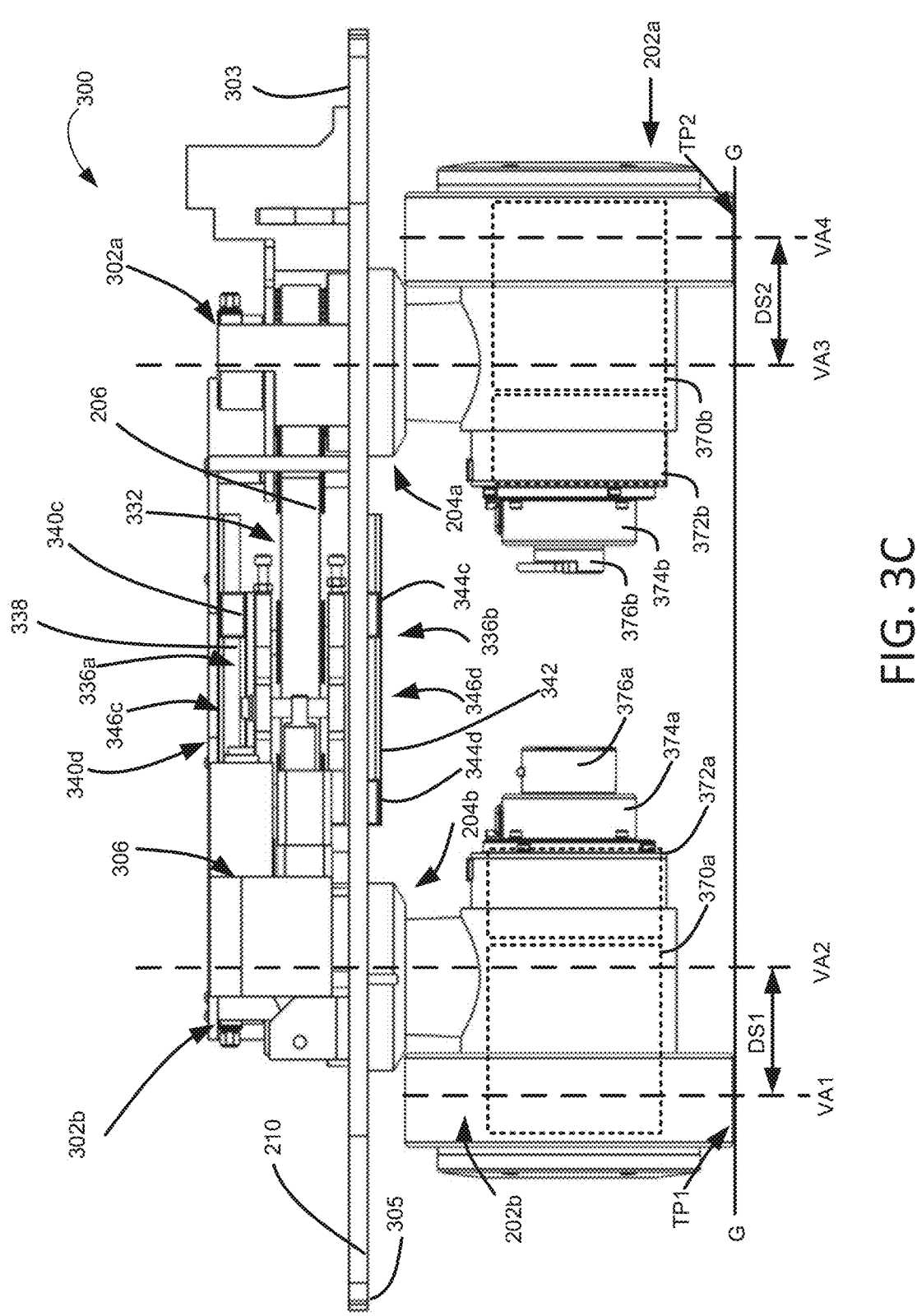
FIG. 3C illustrates a front view of the example adjustable differential drive system.
Figure 3D:
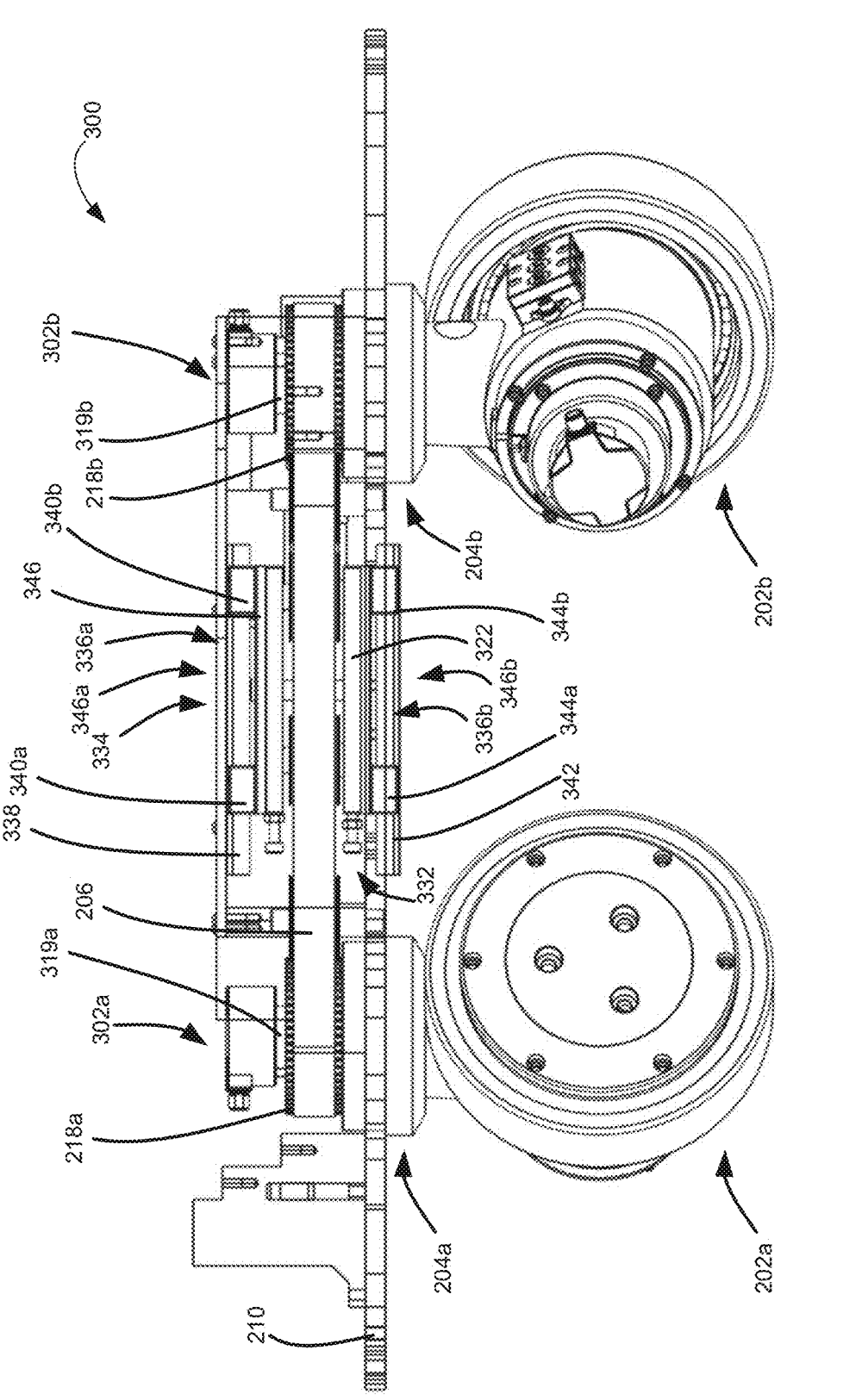
FIG. 3D illustrates a rear view of the example adjustable differential drive system in which the example displaced differential steering assembly is exposed.
Figure 3E:
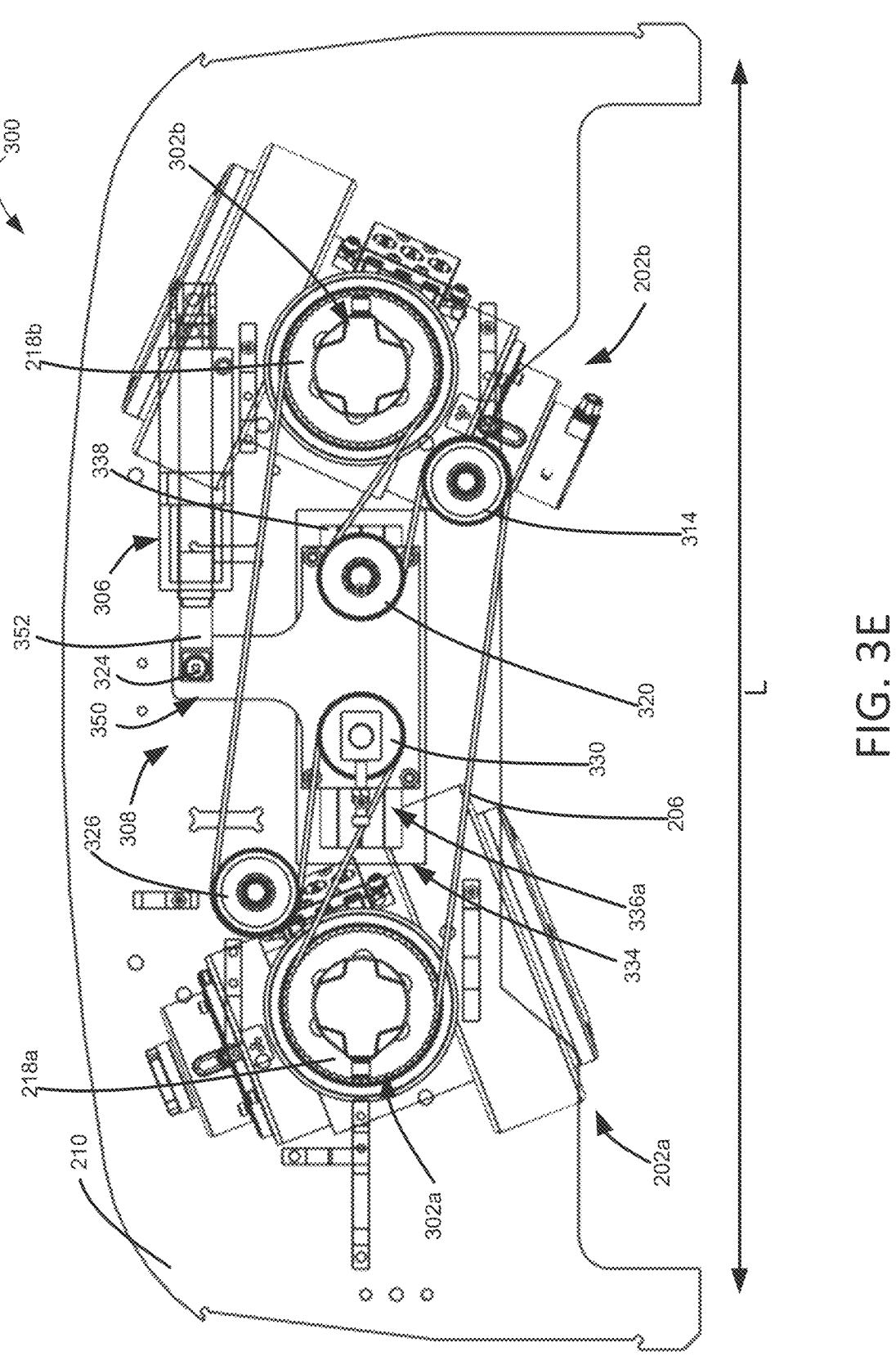
FIG. 3E illustrates a top view of the example adjustable differential drive system in which the example displaced differential steering assembly is exposed.

FIG. 3A illustrates an isometric view of an example adjustable displaced differential drive system 300 (hereinafter "system 300"). FIG. 3B illustrates an example displaced differential steering assembly 301 (hereinafter "steering assembly 301") of the system 300. FIG. 3C illustrates a front view of the system 300. FIG. 3D illustrates a rear view of the system 300 in which the steering assembly 301 is exposed. FIG. 3E illustrates a top view of the system 300 in which the steering assembly 301 is exposed.

The system 300 includes steering assembly 301 and drive wheels 202a and 202b positioned on the frame 210. Drive wheel 202a includes, for example, a gear box 370a, a motor 372a, a brake 374a, and an encoder 376a, as illustrated in FIG. 3C. Drive wheel 202b includes, for example, a gear box 370b, a motor 372b, a brake 374b, and an encoder 376b, as illustrated in FIG. 3C. The motor (e.g., motor 372a, motor 372b) drives the gear box (e.g., gear box 370a, gearbox 370b) that is coupled to the drive wheel. The encoders 376a and 376b may provide to a computing system (e.g., system 710) an indication of speed or rotation per minute of the respective drive wheel 202a and 202b. The brakes 374a and 374b may be, for example, electro-mechanical brakes configured to slow and/or stop the respective drive wheels 202a, 202b. The drive wheels 202a and 202b may be aligned with one another along a length L of the frame 210. The steering assembly 301 may include pivots 204a, 204b, one or more steering encoders (e.g., encoders 302a, 302b), an actuator 306, and one or more pulleys (e.g., pulleys 218a, 218b, 314, 320, 326, and 330) mounted to the frame 210. The actuator 306 and pulleys 218a, 218b, 314, and 326 may be operably coupled to one another via an adjusting mechanism 308 and belt 206. A mounting plate 304 may cover one or more components of the steering assembly 301 to enclose and protect, for example, the movement of the pulleys, belt 206, and adjusting mechanism 308. The mounting plate 304 may be removably coupled to the frame 210.

The belt 206 may operably couple pulleys 218a, 218b, 314, 320, 326, and 330 to one another. Further, the belt 206 may operably couple pulleys 218a, 218b, 314, 320, 326, and 330 to the drive wheels 202a, 202b via pivots 204a, 204b.

Pulley 314 is positioned adjacent to pivot 204a, pulley 218a, and encoder 302a and is mounted to the frame 210 via shaft 316. Shaft 316 may be, for example, a spindle shaft that is coupled to the frame 210, such that the pulley 314 may rotate about the shaft 316 while maintaining a fixed position on the frame 210. Pulley 326 is positioned adjacent to pivot 204b, pulley 218b, and encoder 302b and is mounted to the frame 210 via shaft 328. Shaft 328 may be, for example, a spindle shaft that is coupled to the frame 210, such that the pulley 326 may rotate about the shaft 328 while maintaining a fixed position on the frame 210. Support plates 310 and 312 may be coupled to the respective shafts of the pulleys and encoders to support the rotation of the pulleys and steering of the encoders. For example, shaft 328, shaft 336, and an input shaft 319a of the encoder 302a may be coupled to support plate 310, as illustrated in FIGS. 3A and 3D. In another example, shaft 316, shaft 318, and an input shaft 319b of the encoder 302a may be coupled to support plate 310, as illustrated in FIGS. 3A and 3D.

Figure 3G:
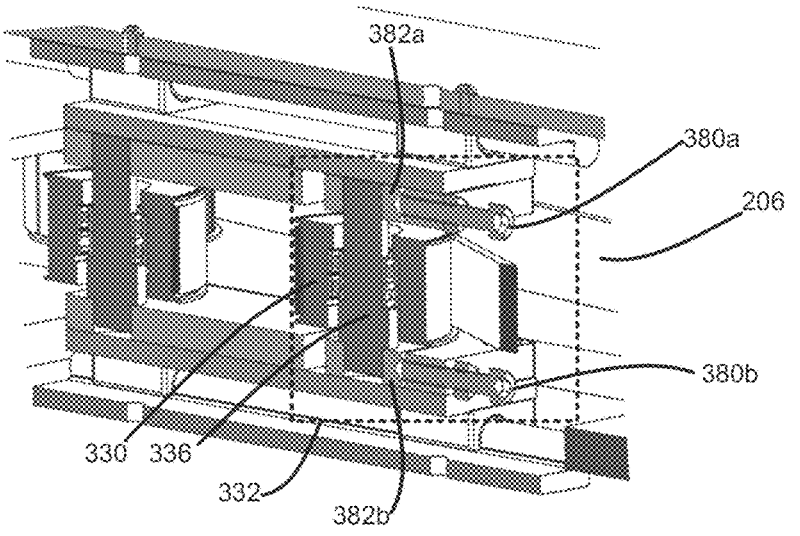
FIG. 3G illustrates a cross-sectional view of an example tensioner.

The adjusting mechanism 308 may be configured to adjust an amount of "toe-in" or "toe-out" between the drive wheels 202a and 202b. That is, the adjusting mechanism 308 may be a steering offset adjusting system. The adjusting mechanism 308 may include a bottom rigid plate 322 and a top rigid plate 346 (as illustrated in FIGS. 3D and 3F), on which pulleys 320 and 330 are mounted, via shafts 316 and 336 respectively. Shafts 316 and 336 may be, for example, spindle shafts that are coupled to the bottom plate 322 and the top plate 346. A first end of the shaft 316 may be coupled to the bottom plate 322 and a second opposite end of the shaft 316 may be coupled to the top plate 346, such that pulley 320 may rotate about the shaft 316 while maintaining a fixed position on the adjusting mechanism 308. Similarly, first end of the shaft 336 may be coupled to the bottom plate 322 and a second opposite end of the shaft 336 may be coupled to the top plate 346, such that pulley 330 may rotate about the shaft 336 while maintaining a fixed position on the adjusting mechanism 308. In one or more cases, pulleys 320 and 330 may function as idler pulleys when stationary relative to the shafts 318 and 336. In some cases, a belt tensioner, such as tensioner 332, may be positioned on one of the pulleys 320, 330. The tensioner 332 may be configured to tighten or loosen the tension of the belt 206 on the pulleys 218a, 218b, 314, 320, 326, and 330. For example, as illustrated in FIGS. 3F and 3G, the tensioner 332 may include tensioning fasteners 380a and 380b operably coupled to respective ends of shaft 336, via guide blocks 382a and 382b. The tensioning fasteners 380a and 380b may be rotated in one direction to move the respective guide blocks, and in turn, the position of pulley 330 to tighten the belt 206. The tensioning fasteners 380a and 380b may be rotated in an opposite direction to move the respective guide blocks, and in turn, the position of pulley 330 to loosen the belt 206.

In one or more cases, the adjusting mechanism 308 includes a guide assembly 334 configured to maintain a direction of travel as the adjusting mechanism 308 moves along the length L of the frame 210. For example, the guide assembly 334 may include one or more tracks, such as tracks 336a and 336b, as illustrated in FIGS. 3C, 3D, and 3F. A track may be positioned on one side of the plate (e.g., plate 322 and 346) of the adjusting mechanism 308. For example, track 336a may be operably coupled to the top plate 346. In another example, track 336b may be operably coupled to the bottom plate 322. The track 336a may include a rigid member 338 fixed to an interior surface of the mounting plate 304 and a one or more channels, such as channels 346a and 346*c*, disposed on opposing sides of the rigid member 338 and along the length L of the frame 210. A channel may be defined by one or more guides, such as guides 340*a*, 340*b*, 340*c*, and 340*d*, which are fixed to an outer surface of the top plate 346. Guides 340*a* and 340*b* may be disposed on one side of the top plate 346, and guides 340*c* and 340*d* may be disposed on the opposite side of the top plate 346. The ends of the rigid member 338 may be shaped and sized to travel within channel 346*a* defined by the guides 340*a* and 340*b* and channel 346*c* defined by the guides 340*c* and 340*d*. The track 336*b* may include a rigid member 342 fixed to one or both of the top surface 303 and bottom surface 305 of the frame 210. The track 336*b* may include one or more channels, such as channels 346*b* and 346*d*, disposed on a side of the rigid member 342 and along the length L of the frame 210. A channel may be defined by one or more guides, such as guides 344*a*, 344*b*, 344*c*, and 344*d*, which are fixed to an outer surface of the bottom plate 322. Guides 344*a* and 344*b* may be disposed on one side of the bottom plate 322, and guides 344*c* and 344*d* may be disposed on the opposite side of the bottom plate 322. The ends of the rigid member 342 may be shaped and sized to travel within channel 346*b* defined by the guides 344*a* and 344*b* and channel 346*d* defined by the guides 344*c* and 344*d*.

The bottom plate 322 and the top plate 346 of the adjusting mechanism 308 may each include a protruded portion 350 in which a rod 324 is disposed therebetween. Each end of the rod 324 may be coupled to the bottom plate 322 and the top plate 346, respectively. The rod 324 may be aligned with and coupled to the shaft 352 of the actuator 306. The rod 324 may be, for example, but not limited to, a fastener, such as a screw. The shaft 352 of the actuator 306 is configured to move in and out of the actuator 306 in the direction of the length L of the frame 210. As the actuator 306 moves the shaft 352, the adjusting mechanism 308 may move in a direction corresponding to the movement of the shaft 352. In one or more cases, the guide assembly 334 is positioned parallel to the length of the shaft 352 and facilitates the direction of travel for the adjusting mechanism 308. By virtue of the actuator 306 directing travel of the adjusting mechanism 308 along Length L, the pulleys 320 and 330 are configured to be adjustable in position relative to the pivots 302*a* and 302*b*.

The encoders 302*a* and 302*b* may be, for example, steering encoders configured to indicate an angle of a direction of travel for the drive wheels 202*a* and 202*b*. The encoders 302*a* and 302*b* may be coupled to the respective drive wheels 202*a* and 202*b*, via pivots 204*a* and 204*b* and pulleys 218*a* and 218*b* respectively. Pivot 204*a* and pivot 204*b* may each be coupled to the frame 210. A pulley and an encoder (e.g., pulley 218*a* and encoder 302*a*) are positioned on one side of the pivot (e.g., pivot 204*a*) and a drive wheel (e.g., drive wheel 202*a*) is positioned on the opposite side of the pivot. A pivot may be a rigid body that houses one or more portions of the respective drive wheel and components that couple the pulley (e.g., pulleys 218*a*, 218*b*) to the drive wheel therein. The pivot may operably couple a pulley to the drive wheel. For example, pivot 204*a* may operably couple the drive wheel 202*a* to the pulley 218*a*. Pulleys 218*a*, 218*b* are configured to rotate drive wheels 202*a*, 202*b* about the vertical axis of the respective pulley based on the direction in which belt 206 moves. The pulleys 218*a*, 218*b* may each receive and be coupled to a shaft of the respective encoder 302*a*, 302*b* therein. The encoders 302*a*, 302*b* may be configured to determine an angular position of the respective pulley 218*a*, 218*b*, and in turn, the angular position of the coupled drive wheel 202*a*, 202*b*. The angular position may be provided to a computing system, such as the computing system of machine 100 or another computing system that controls the functionality of the displaced differential drive system 300. Based on the determined angular position, a computing system may associate the angular position of the respective shaft to the angular position of the respective drive wheel. As such, the computing system determines the angle of travel of the entire machine 100.

In one or more cases, one or more computing systems of the machine 100 or other computing system that controls the functionality of the displaced differential drive system 300 may be configured to control speed and steering. For example, the machine 100 may be configured to determine two points (i.e., points that continually change as the machine is moving). One point may be "S" (e.g., the desired speed of the machine 100). The second point may be "A" (e.g., the desired trajectory, or angle of travel). The machine 100 may set the speed "S" for both drive wheels 202*a* and 202*b*. The machine 100 determines an angle "A" as the value that the hypothetical center wheel (e.g., an assumed wheel that would be located in between both drive wheels 202*a* and 202*b*) should be oriented. The machine 100 references a table indicating an angle (i.e., the angle of the hypothetical center wheel) and corresponding actual angles of each drive wheel 202*a* and 202*b*. In some cases, an actual angle of one drive wheel is an angle greater than the angle of the hypothetical center wheel (i.e., the real travel direction), and an actual angle of the other drive wheel is an angle less than the angle of the hypothetical center wheel (i.e., the real travel direction). The machine 100 may receive/determine the value for the angle of each drive wheel (e.g., 100 times a second) and the corresponding speed of each drive wheel. In one or more cases, based on the four readings, the machine 100 adjusts the angle of each drive wheel 202*a* and 202*b* by differential steering (i.e., by increasing the speed of one wheel while decreasing the speed of the other wheel, thereby causing both drive wheels 202*a*, 202*b* to turn together left or right as needed). In one or more cases, based on the four readings, the machine 100 simultaneously adjusts for Ackermann by comparing to the table what the spread should be at whatever angle it is traveling, and it extends or retracts the actuator accordingly. The machine 100 determines that extending the actuator 306 correlates to more toe-out and retracting the actuator 306 correlates to more toe-in.

In one or more cases, the drive wheel is connected to a respective pivot, such that a vertical axis of the connection to the respective pivot is laterally offset from a vertical axis of a traction point of the drive wheel. The traction point may refer to a location in which a portion of the drive wheel contacts the surface of the ground. For example, as illustrated in FIG. 3C, the vertical axis VA3 of the pivot 204*a* is laterally offset by a distance DS2 from the vertical axis VA4 of the traction point TP2 of the drive wheel 202*a* that contacts ground G. The vertical axis VA3 and the vertical axis VA4 may be offset from one another by, for example, a distance of 80 mm or about 80 mm (i.e., an 80 mm moment). In another example, the vertical axis VA2 of the pivot 204*b* is laterally offset by a distance DS1 from the vertical axis VA1 of the traction point TP1 of the drive wheel 202*b* that contacts ground G. The vertical axis VA2 and the vertical axis VA1 may be offset from one another by, for example, a distance of 80 mm or about 80 mm (i.e., an 80 mm moment).

Figure 4A:
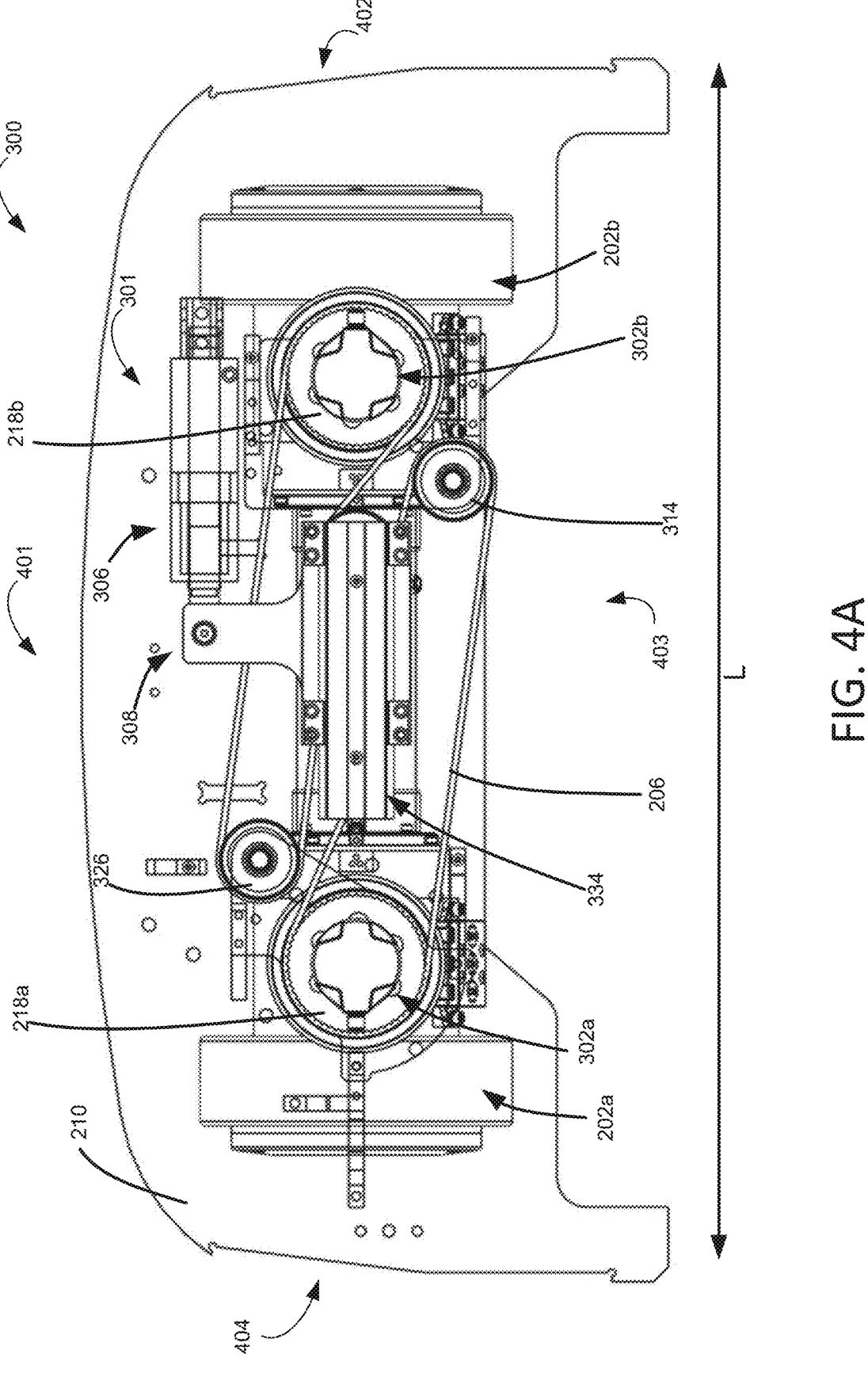
FIGS. 4A-4G illustrate various configurations of the displaced differential steering assembly and drive wheels during travel.
Figure 4B:
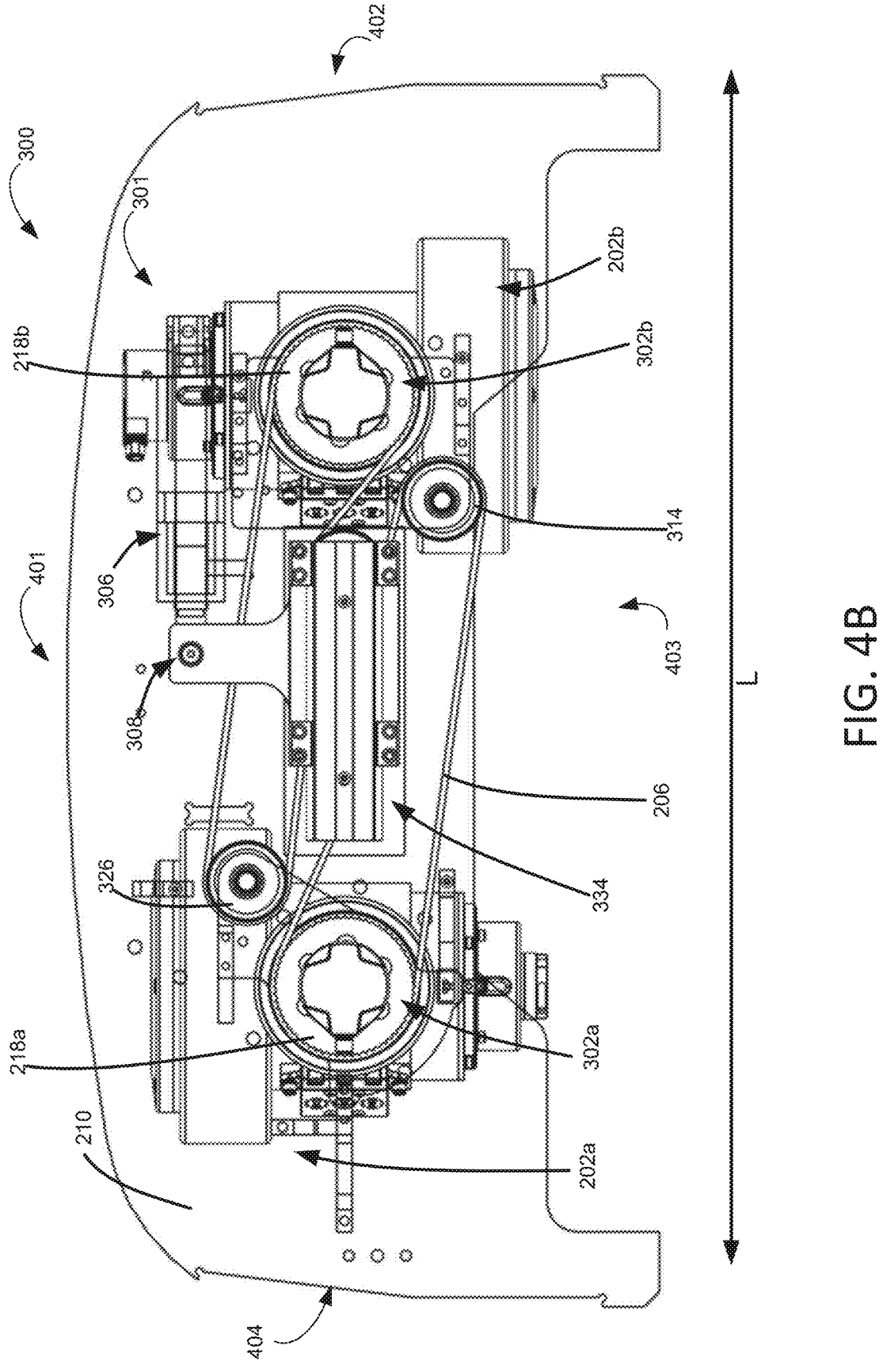

FIGS. 4A-4E illustrate various configurations of the steering assembly 301 and drive wheels 202*a*, 202*b* during travel. It should be appreciated that the drive systems 200 and 300 described herein are not in any way limited to a particular set of configurations, and thus those shown in the Figures are for illustrative purposes only. Accordingly, the drive systems 200 and 300 may achieve any configuration representing all combinations of the two drive wheels independently at any point in rotation about their respective offset pivots. For example, FIG. 4A illustrates a first configuration in which both drive wheels 202a, 202b are oriented parallel to one another and face a first side 401 and a second side 403 of the system 300. As such, the steering assembly 301 is configured to move in a straight direction (e.g., forward and backward). In another example, FIG. 4B illustrates a second configuration in which both drive wheels 202a, 202b are oriented laterally (e.g., at 90 degrees from the first configuration) facing sides 402 and 404. In the second configuration, the steering assembly 301 may move in a lateral direction (e.g., side to side in the direction L). As the drive wheels 202a, 202b are arranged parallel to one another, the adjusting mechanism 308 and actuator 306 are in the same position as when the drive wheels 202a, 202b are arranged in the first configuration.

In one or more cases, in the first configuration and the second configuration, the actuator 306 may position the adjusting mechanism 308, such that the drive wheels 202a, 202b are arranged parallel to one another based on the respective configuration. Each drive wheel 202a, 202b may be driven at the same speed allowing the system 300 to move in a linear direction. For example, in the first configuration, the system 300 may move forward or backward based on the direction of rotation of the drive wheels 202a, 202b. In another example, in the second configuration, the system 300 may move laterally to a third side 402 or a fourth side 404 of the system 300 based on the direction of rotation of the drive wheels 202a, 202b. For the cases in which the system 300 transitions from a first configuration to a second configuration or vice versa, the system 300 may remain stationary while drive wheels 202a, 202b turn a short distance in opposite directions. That is, the drive wheels 202a, 202b may rotate from the first configuration 90 degrees in opposite directions from each other into the second configuration.

Figure 4C:
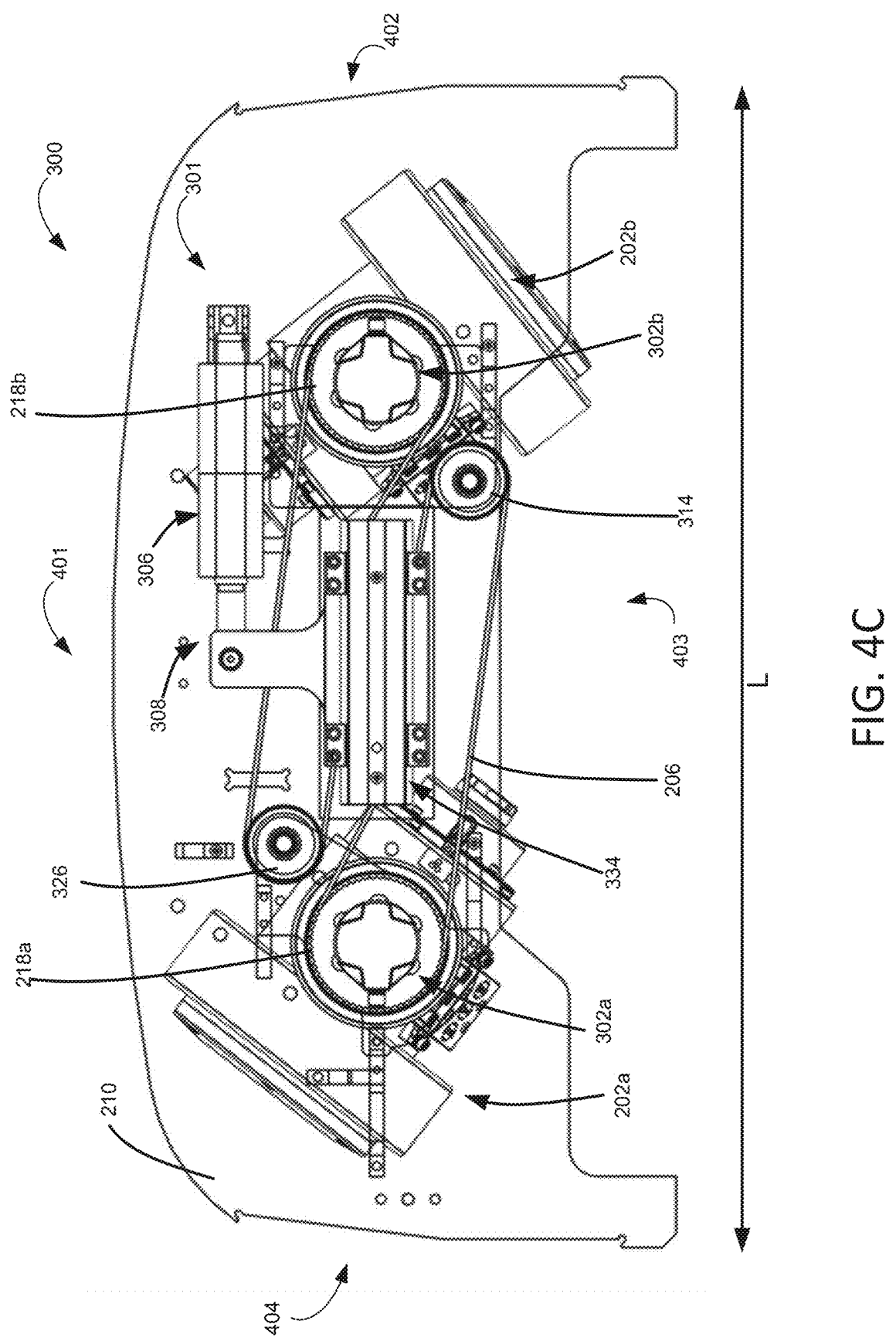
Figure 4D:
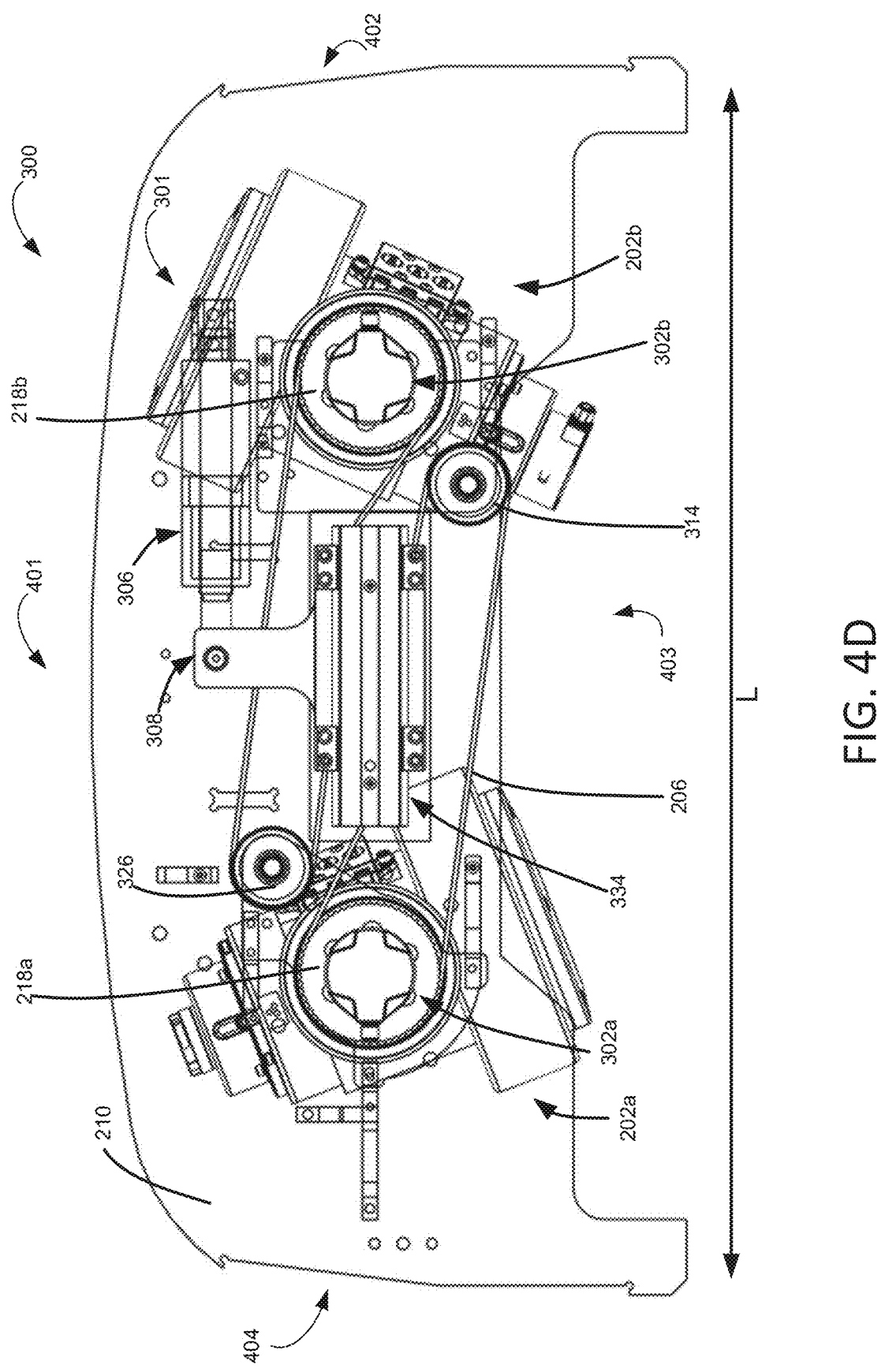
Figure 4E:
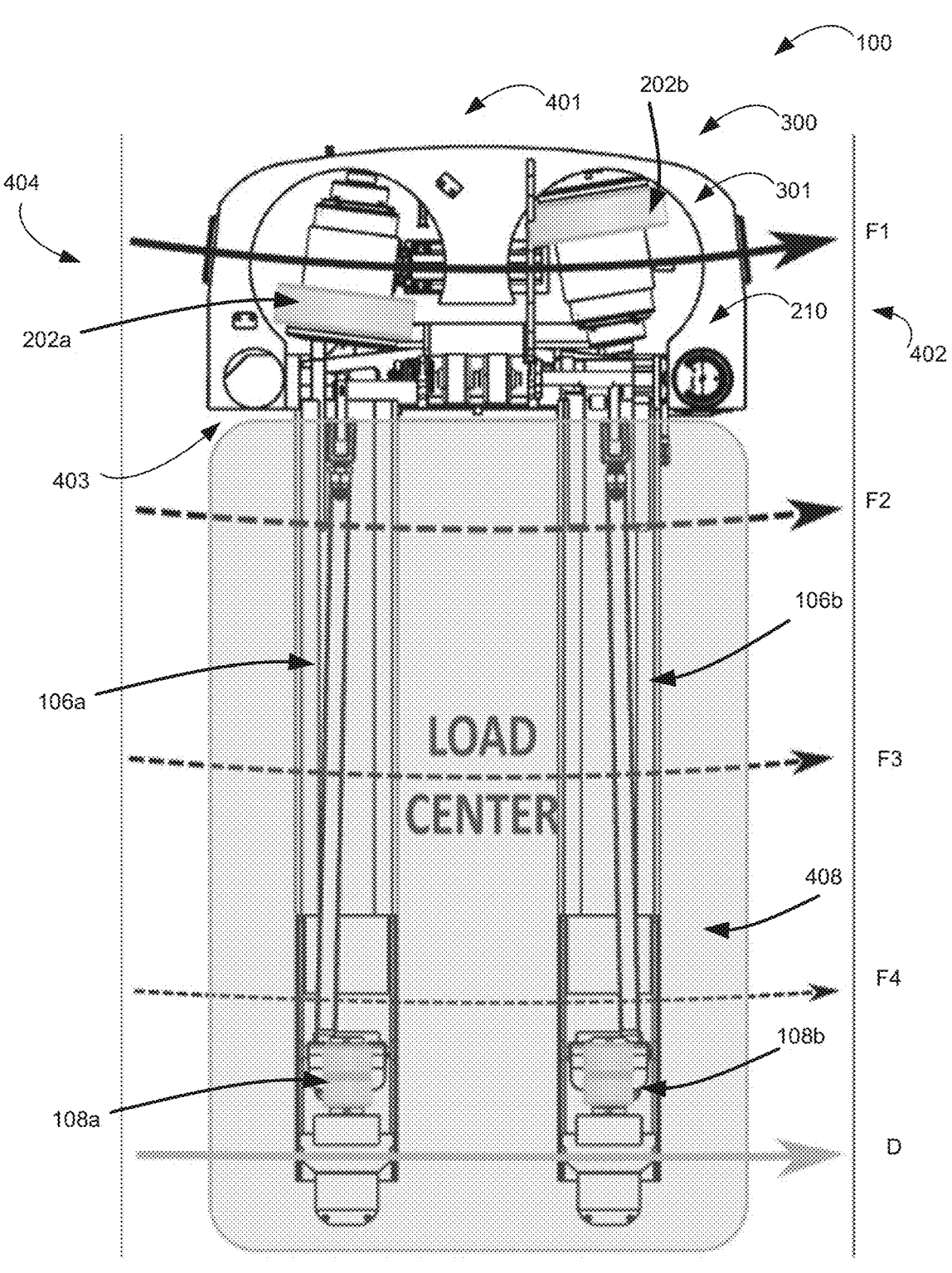

FIG. 4C illustrates a third configuration in which both drive wheels 202a, 202b are turning and are subjected to Ackermann steering, thus the drive wheels 202a, 202b are not parallel to one another. The drive wheels 202a, 202b may be oriented in the third configuration to travel by turning. FIGS. 4D and 4E illustrate a fourth configuration and fifth configuration, respectively, in which both drive wheels 202a, 202b are configured at different angles from one another and are thus not parallel to one another. The drive wheels 202a, 202b in the fourth and fifth configurations are subjected to Ackermann steering. The drive wheels 202a, 202b in the fourth configuration are arranged such that the system 300 may rotate about its center, as illustrated in FIG. 4D.

Figure 4F:
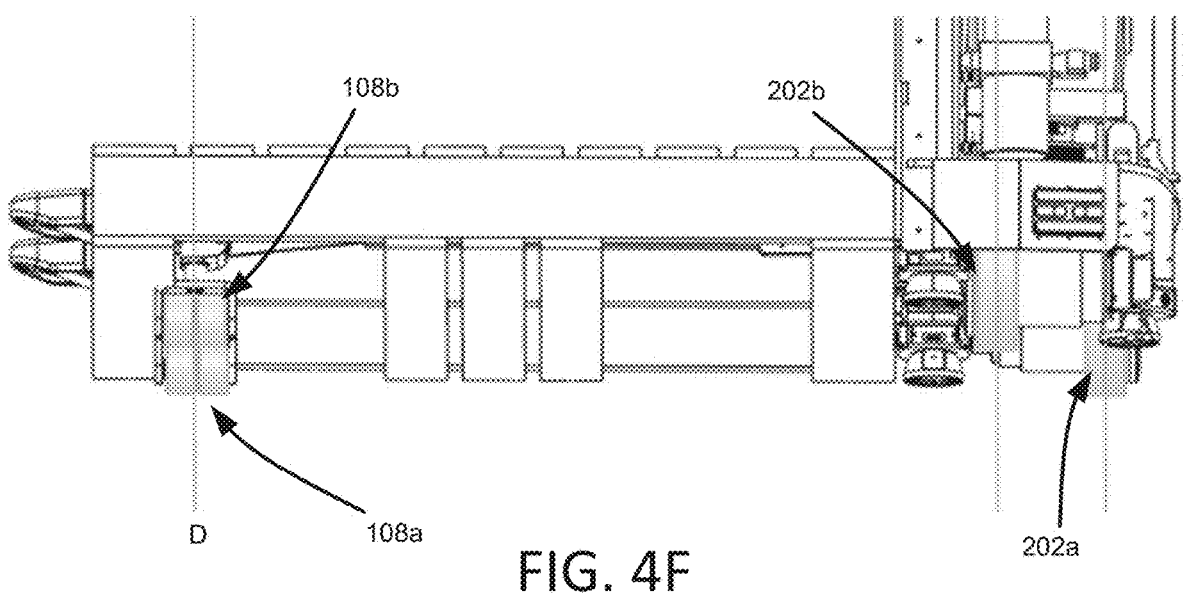
Figure 4G:
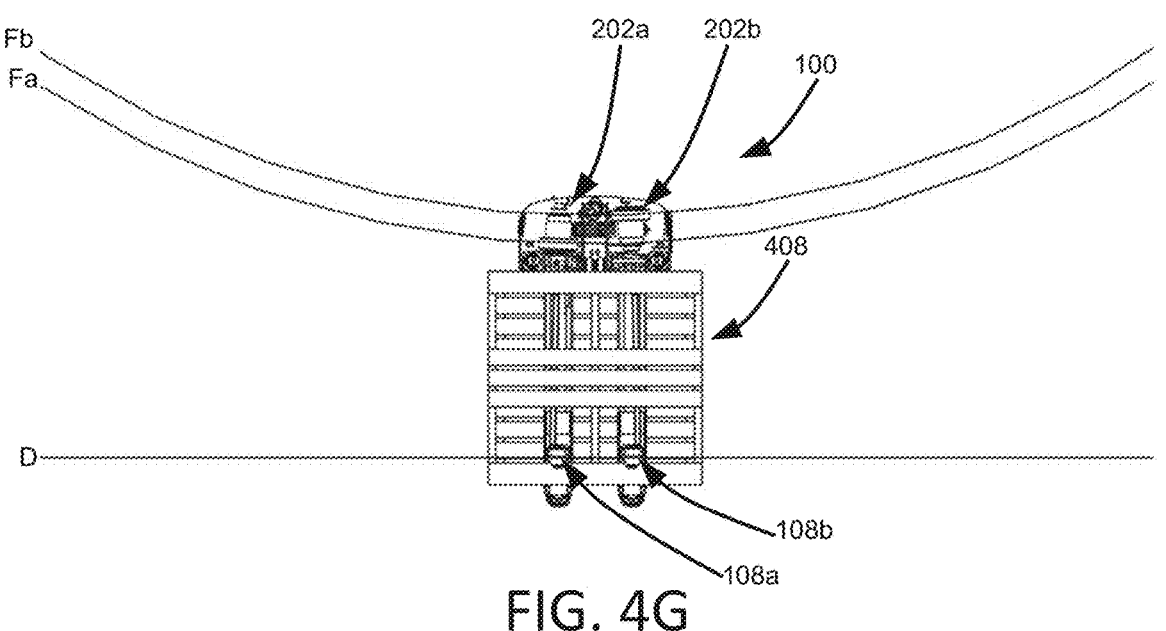

The drive wheels 202a, 202b in the fifth configuration are arranged such that the system 300 may move laterally while moving a load 408 creating a moment at the distal end of the machine 100, as illustrated in FIGS. 4E, 4F, and 4G. FIG. 4F illustrates the system 300 moving laterally in direction D while moving a load that generates little to an inconsequential amount of inertia on the machine 100. FIGS. 4E and 4G illustrate the system 300 moving laterally in direction D while moving a load that generates inertia on the machine 100. As the load 408 may be located on the forks 108a, 108b a distance away from the system (e.g., system 102, 200, or 300) (as illustrated in FIGS. 4E and 4G), the machine 100 is configured to overcome inertia of the load 408 to prevent the machine 100 traveling in an arc. The machine 100 overcomes the inertia of the load 408 when the system (e.g., system 102, 200, or 300) steers the machine 100 in a large arc (e.g., directions Fa and Fb as illustrated in FIG. 4G) in the opposite direction, away from the load 408, as illustrated in FIG. 4G. Steering the machine 100 in an arc in the opposite direction away from the load 408 counters that inertial drag from the load 408 and results in the combined machine 100 and load 408 moving laterally and in a straight line (e.g., direction D as illustrated in FIG. 4G).

In the third, fourth, and fifth configurations (i.e., the Ackermann steering configurations), each drive wheel is driving at a faster or slower speed relative to the other drive wheel, resulting in differential steering while simultaneously, Ackermann steering adjustment is applied to the steering assembly 301 by the movement of the actuator 306 to move the adjusting mechanism 308, and change the relative angles of pulleys 320 and 330. For instance, the actuator 306 moves the adjusting mechanism 308 about the length L according to the steering angle or orientation of the drive wheels 202a, 202b.

For the cases in which the system 300 is incorporated into, for example, machine 100, drive wheels 202a, 202b may be positioned on one end of the machine 100 and undriven wheels 108a, 108b may be positioned on an opposite end of the machine 100. The undriven wheels 108a, 108b may rotate towards the direction of travel. For example, to move a load 408 via the machine 100 in a lateral direction (e.g., direction D as illustrated in FIG. 4E), the undriven wheels 108a, 108b may be oriented perpendicular to the machine 100. The load 408 may be positioned on the forks 106a, 106b of the machine 100. During acceleration or deceleration of one of the drive wheels (e.g., drive wheel 202b), the inertial effect of the load 408 is felt and attempts to skew the direction of travel, off the intended 90-degree lateral travel direction. The force (e.g., force F1) generated by friction contact as the drive wheels 202a, 202b and undriven wheels 108a, 108b move along the ground is strongest at the location where the moment is generated in the frame 210 between the drive wheels 202a, 202b. The force (e.g., forces F2, F3, F4) gradually reduces in strength at locations of the forks 106a, 106b that are farther away from the generated moment.

To move in the lateral direction D with the example load 408, as illustrated in FIGS. 4E and 4G, the drive wheels 202a, 202b may be oriented at, for example, but not limited to, 2 degrees to 4 degrees or about 2 degrees to 4 degrees off perpendicular from the first configuration of the drive wheels 202a, 202b. The drive wheels 202a, 202b may be oriented to rotate the ends of the forks 106a, 106b around the frame 210, by applying a force to the end of the machine 100 that includes the system 300 and in a direction (e.g., direction D) of travel. For example, one drive wheel may be configured to maintain an 89 degree angle and the other drive wheel may be configured to maintain a 91 degree angle. The actuator 306 may move the adjusting mechanism 308 accordingly to provide the 2 degrees of difference (from parallel) and maintain the lateral direction of travel. When lateral travel begins, the inertia of the load 408 causes the forks 106a, 106b to pull backwards. When the machine 100 attempts to stop, the traveling inertia of the load 408 causes the forks 106a, 106b to continue to move forward, and thus rotates the machine 100 about the frame 210. Accordingly, the inertia generated by the load 408 when the machine 100 accelerates causes the machine 100 to skew travel in one direction, and the inertia generated by the load 408 when the machine 100 decelerates causes the machine 100 to skew travel in an opposite direction. As such, to account for the forces applied to the machine 100, the drive wheels 202*a*, 202*b* may constantly adjust their angle of orientation. In one or more cases, the drive wheels 202*a*, 202*b* may rotate at the same RPM. When the machine 100 moves at a constant velocity, the system 300 may further utilize Ackermann steering by offsetting the angles of the drive wheels 202*a*, 202*b* to increase the moment at the ends of the forks 106*a*, 106*b* and move the load laterally as intended. Although the example of FIG. 4E is described with respect to moving the machine 100 in a lateral direction, it is understood that the same principles of maintaining angles of orientation of the drive wheels 202*a* and 202*b* and accelerating/decelerating the rotation of the drive wheels 202*a* and 202*b* may be implemented to turn the machine 100 in a direction or rotate the machine 100 about the center of system 300.

FIGS. 5A-5F are diagrams of the example differential drive system 300 illustrating additional configurations of the steering assembly 301 and drive wheels 202*a*, 202*b* during travel. As described herein, system 300 may include a brake operably coupled to a pivot and/or pulley. For example, a brake may be operably coupled to the pivot 204*a*. The brake may be configured to lock the orientation of respective the drive wheel, such that the drive wheel docs not unintentionally rotate to another angle. In some cases, the brake may be, for example, but not limited to, an electro-magnetic brake configured to prevent the respective drive wheel from turning/reorienting from its position. In other cases, the brake may lock the belt 206 and/or one or more pulleys to prevent a drive wheel from turning/reorienting from its position. In some cases, one or more brakes may be coupled directly to a pulley to lock the pulley from turning. In some cases, one or more brakes may be coupled directly to the belt 206 to hold the belt, thereby locking the steering. In some cases, a brake may be configured to lock a single side of the drive system as with the belt 206 of the differential drive system connecting the pulleys that are connected to the steering axes of each drive unit. For instance, locking any position of the single side of the drive system may lock both sides of the drive system.

Figures 5A, 5B:
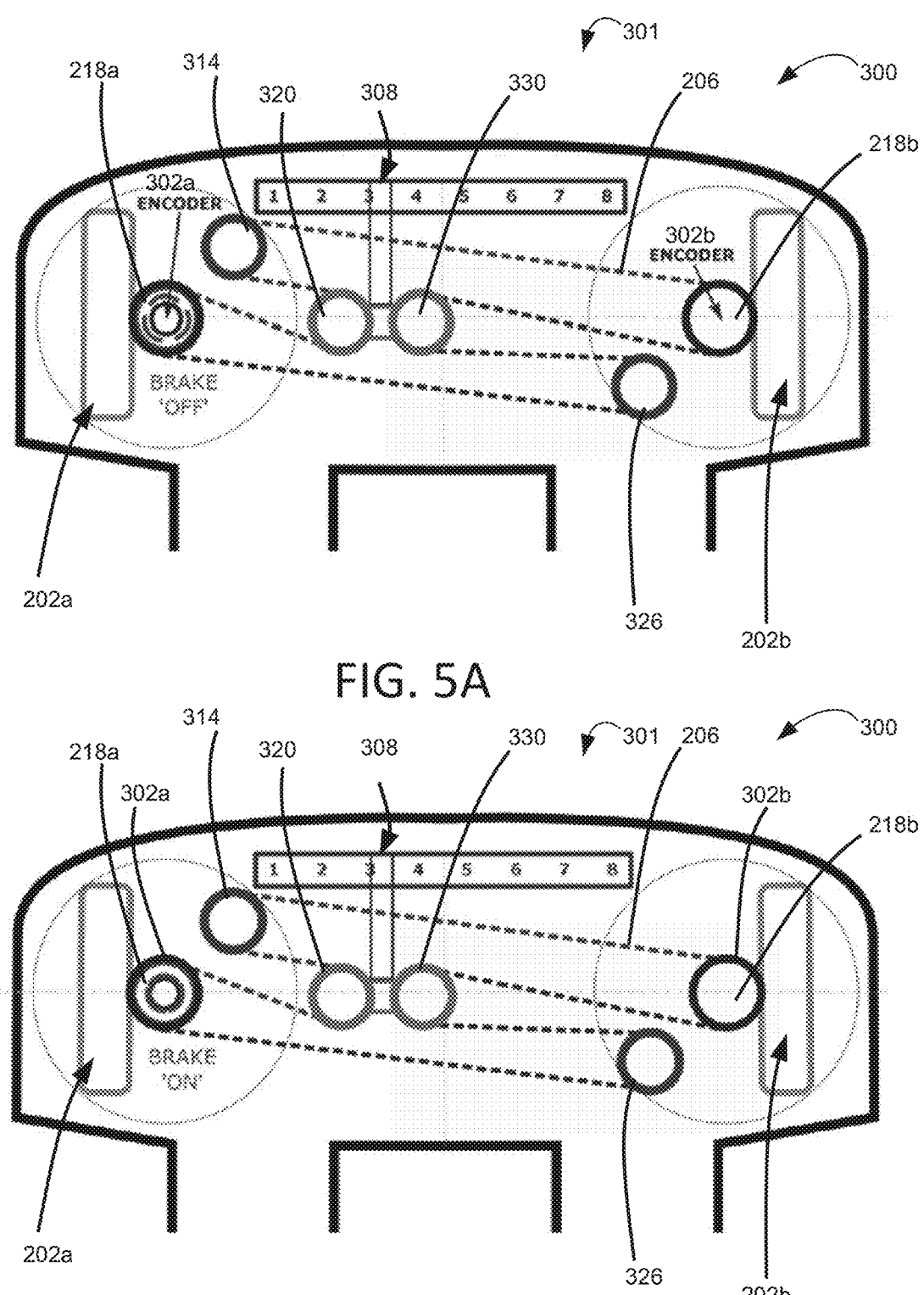
FIGS. 5A-5F are diagrams of the example adjustable differential drive system illustrating various configurations of the displaced differential steering assembly and drive wheels during travel.

FIG. 5A illustrates the system 300 configured for straight travel, in which the drive wheels 202*a*, 202*b* are oriented parallel to one another and the adjusting mechanism 308 remains in position during travel. The drive wheels 202*a* and 202*b* may rotate in the same direction and at the same RPM to move the system 300 in a straight direction. In this configuration, the brake may not be engaged.

FIG. 5B illustrates the system 300 configured for straight travel at high speeds or when traveling over uneven terrain. In this configuration, the drive wheels 202*a*, 202*b* are oriented parallel to one another and the brake is engaged to lock the drive wheels 202*a*, 202*b* from turning unintentionally. For example, if the system 300 travels over uneven ground, such as traversing dock plates, the brake may prevent the drive wheel from turning/reorienting from its position and maintain its direction of travel. The adjusting mechanism 308 remains in position during travel.

Figure 5C:
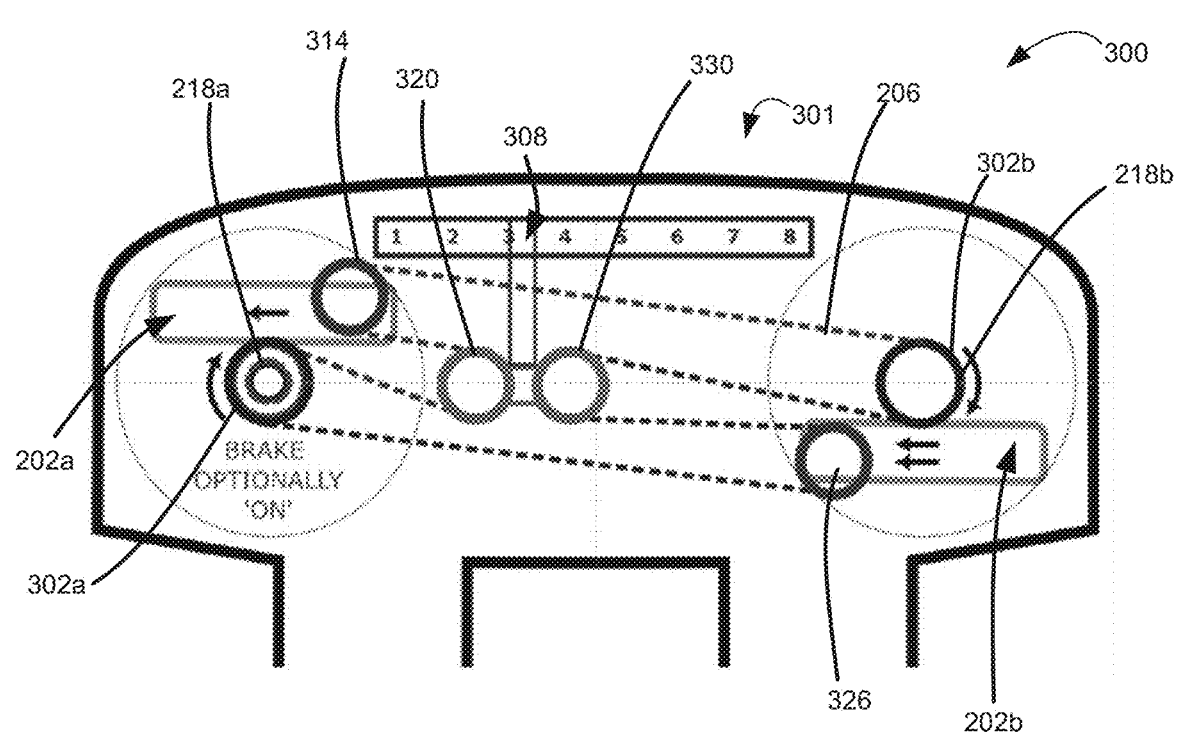

FIG. 5C illustrates the system 300 configured for lateral travel, in which the drive wheels 202*a*, 202*b* are oriented parallel to one another and rotated to a horizontal position about the frame 210. The adjusting mechanism 308 remains in position during travel. In this configuration, the brake may be optionally engaged. For the cases in which the brake is engaged or end-stops prevent the drive wheel 202*a* from rotating beyond a particular angle, increasing the RPM of the drive wheel 202*b* (e.g., to travel to the left of the system 300) at a rate that is greater than the RPM of the drive wheel

202*a*, a moment is created that may push the system 300 to travel in the direction of rotation of the drive wheel 202*b* (e.g., to the left). The system 300 may include one or more sensors to determine a weight of the load on the machine 100 and to determine the orientation of the machine 100 as it travels. The feedback from these sensors may be provided to the computing system of the machine 100 to determine the appropriate force differential applied to drive wheels 202*a* and 202*b*. In some cases, the drive wheels 202*a*, 202*b* may be configured to automatically adjust respective amperage (i.e., correlating to torque) to ensure the same voltage (i.e., RPM of the respective drive wheel) is being applied to each drive wheel. This adjustment may be used to ensure that the system 300 is traveling laterally in a straight direction.

Figure 5D:
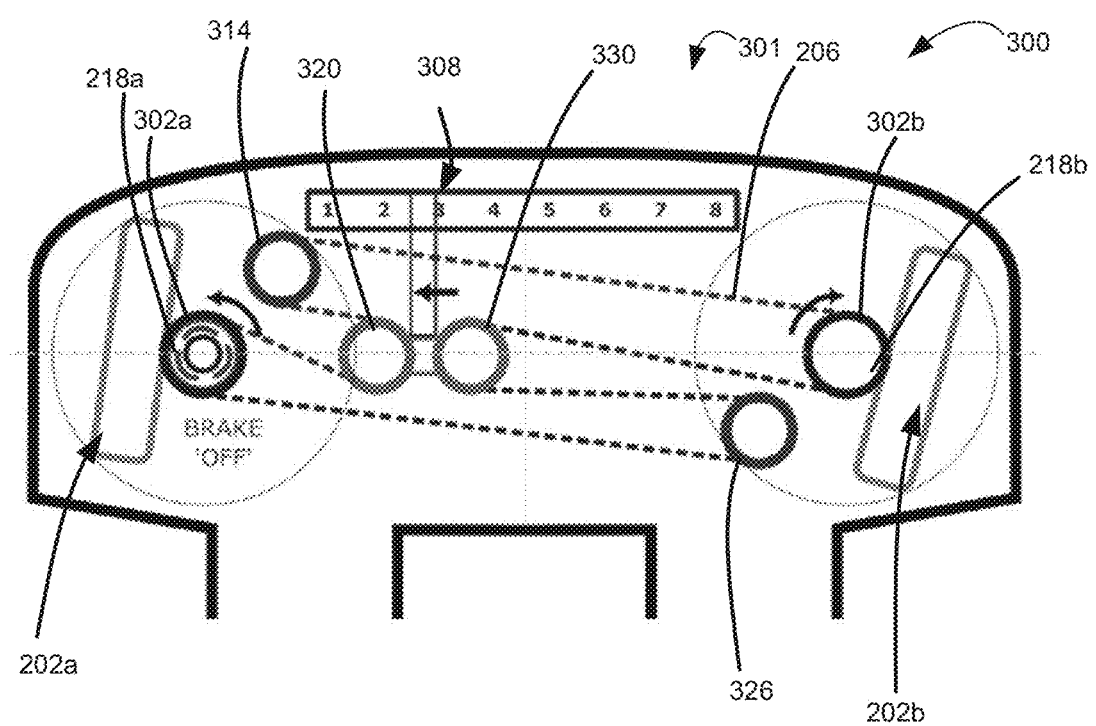
Figure 5E:
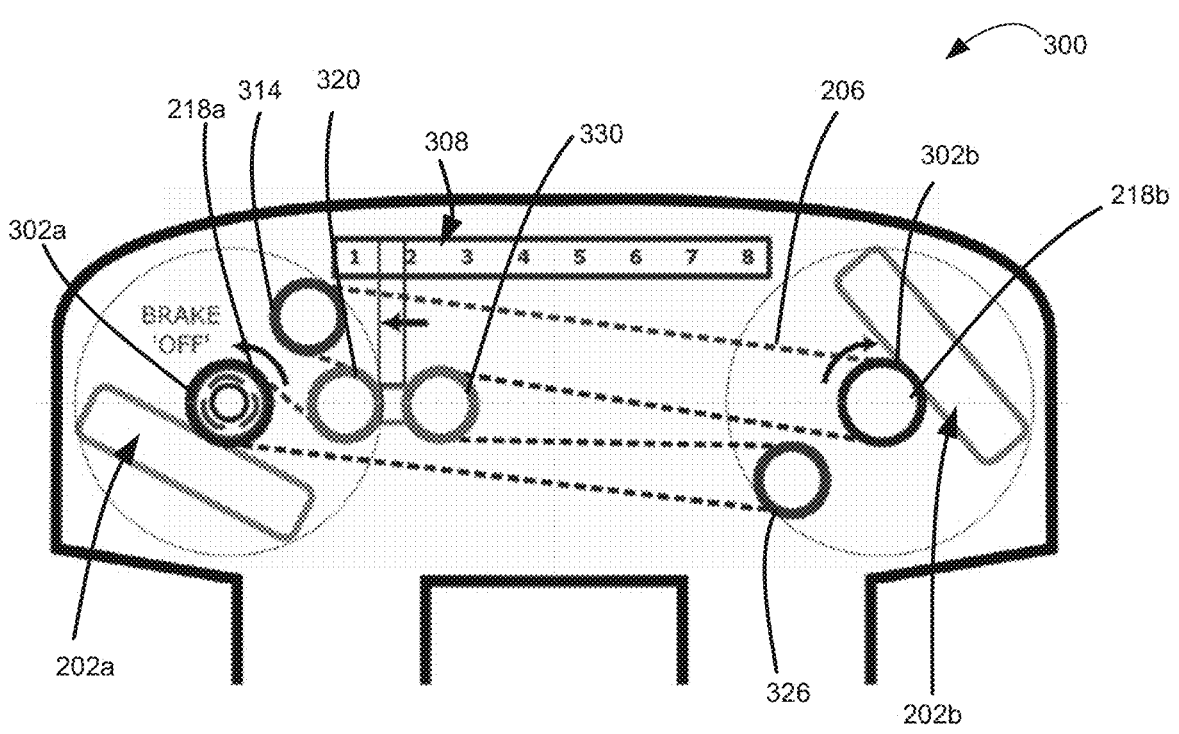

FIG. 5D illustrates the system 300 configured for travel while turning (e.g., traveling in a medium tight turn, such as a right turn). The linkage 308 may move along the length L of the frame 210 such that the drive wheels 202*a*, 202*b* "toe-out" relative to each other. The linkage 308 may move along the length L as the system 300 is traveling to continually adjust the "toe-in" and "toe-out" of the drive wheels 202*a*, 202*b*, thereby allowing the system 300 to continue turning as it is traveling. In this configuration, the brake may not be engaged. FIG. 5E illustrates the system 300 configured for travel while turning (e.g., traveling in a very tight turn). The linkage 308 may move farther along the length L of the frame than that of the linkage 308 position in FIG. 5D, such that the drive wheels 202*a*, 202*b* "toe-out" farther relative to each other. In this configuration, the brake may not be engaged.

The feedback provided by each encoder 302*a*, 302*b* in any of the configurations provided herein indicates the orientation/angle of each drive wheel 202*a*, 202*b*. Based on the feedback, the orientation/angle of each drive wheel 202*a*, 202*b* may be adjusted accordingly, and the differential between the RPM of each drive wheel 202*a*, 202*b* allows the steering to be changed as needed. In one or more cases, the feedback provided by each encoder 302*a*, 302*b* allows the computing system to precisely set the angle of each drive wheel 202*a*, 202*b* to provide minimal wheel skid. Further, the angular offset of each drive wheel 202*a*, 202*b* may be continually hundreds of times per second. The steering assembly 301 may maintain the same tension on the belt 206 regardless of the orientation of the drive wheels 202*a*, 202*b* or the position of the pulleys.

Figure 5F:
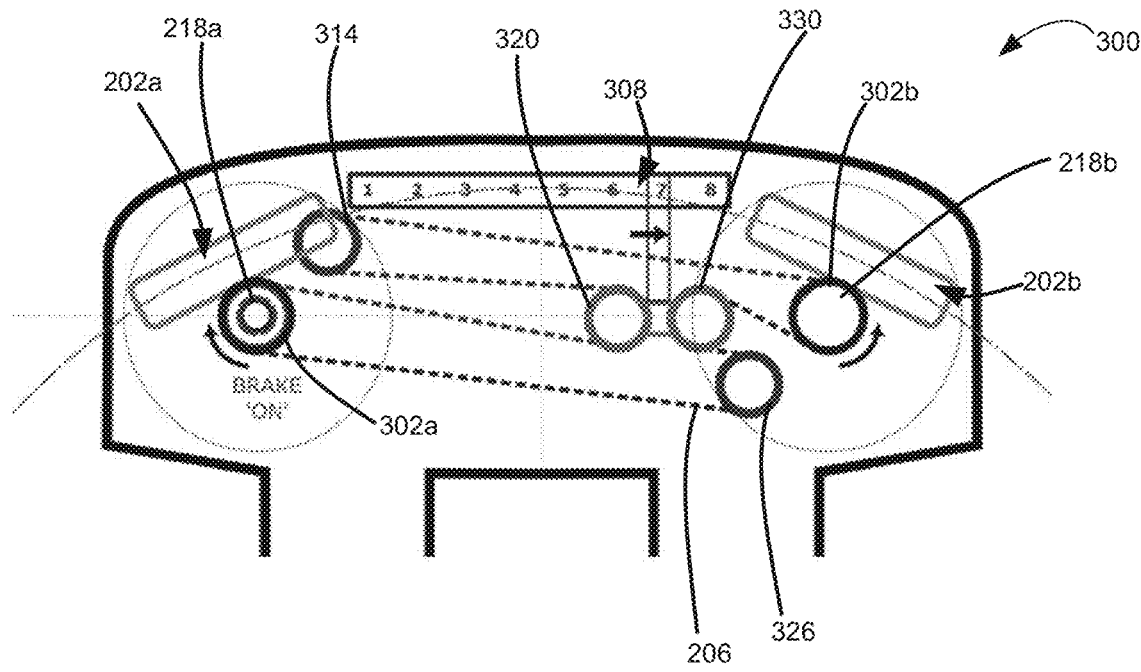

FIG. 5F illustrates the system 300 configured for travel to rotate about the center (RoC position) of the system 300. In one or more cases, to position the drive wheels 202*a*, 202*b* in the RoC position, the linkage 308 may move along the length L of the frame 210 towards the drive wheel 202*a* until the drive wheel 202*a* rotates into the ROC position. The brake may engage the drive wheel 202*a* to lock the drive wheel 202*a* in the ROC position. The linkage 308 may then move in the opposite direction towards the drive wheel 202*b* until the drive wheel 202*b* rotates into the RoC position. In one or more other cases, to position the drive wheels 202*a*, 202*b* in the RoC position, the linkage 308 may move along the length L of the frame 210 towards a drive wheel until both drive wheels are positioned or roughly positioned in the ROC position. For the cases in which the drive wheels are not oriented symmetrical to one another but have the correct offset per the position of the linkage 308, one wheel may be driven forward, and the other wheel may be driven backwards, thereby orienting the drive wheels in the RoC position.

Figure 6A:
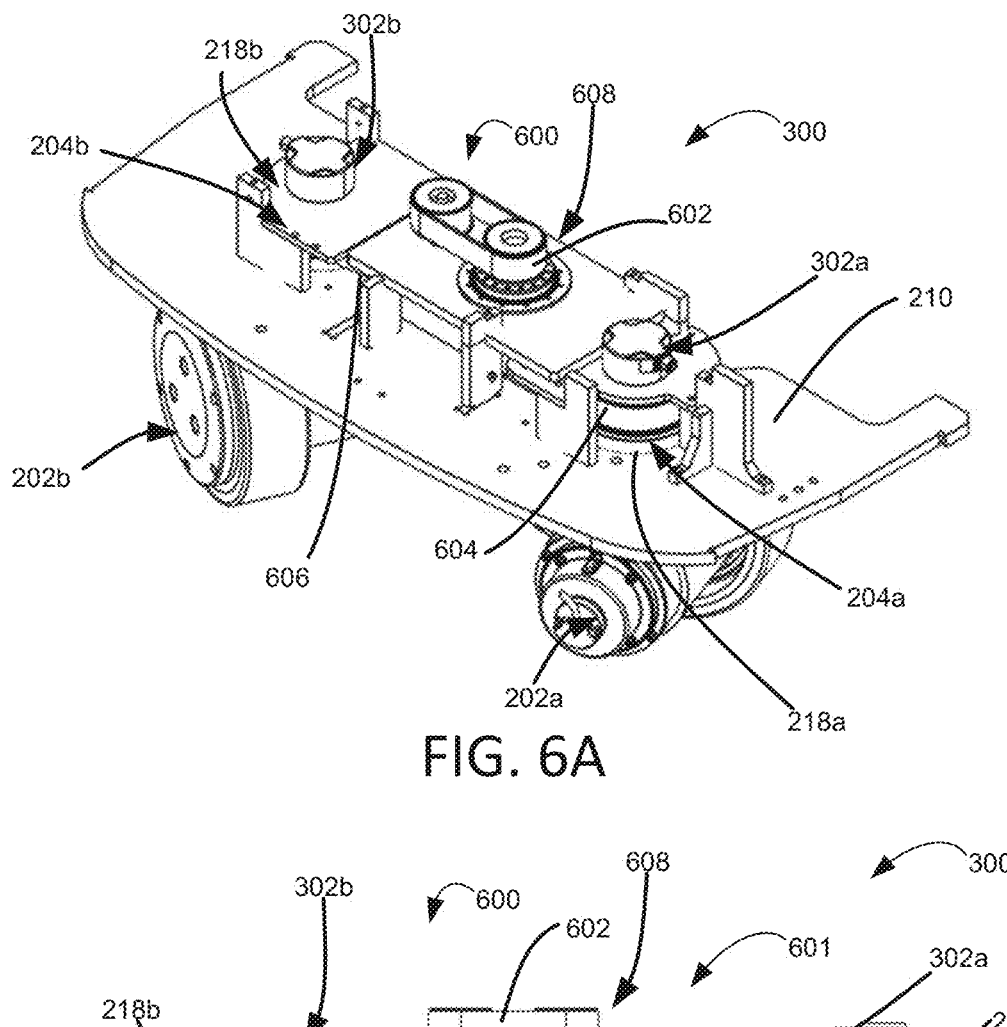
FIG. 6A illustrates an isometric view of an example adjustable differential drive system utilizing another example displaced differential steering assembly.
Figure 6B:
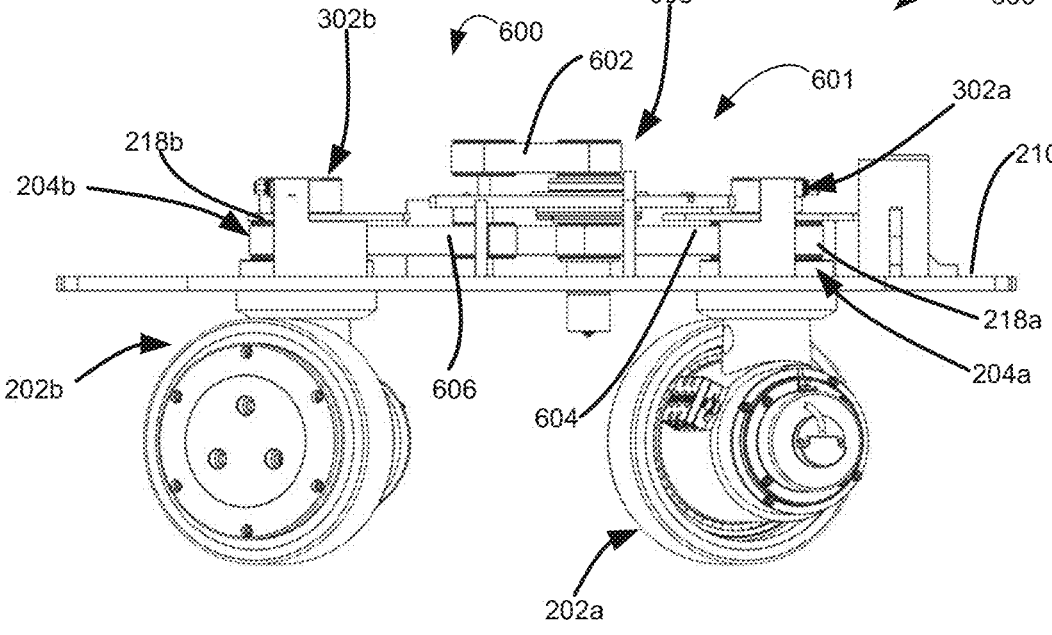
FIG. 6B illustrates a front view of the example adjustable differential drive system of FIG. 6A.
Figure 6C:
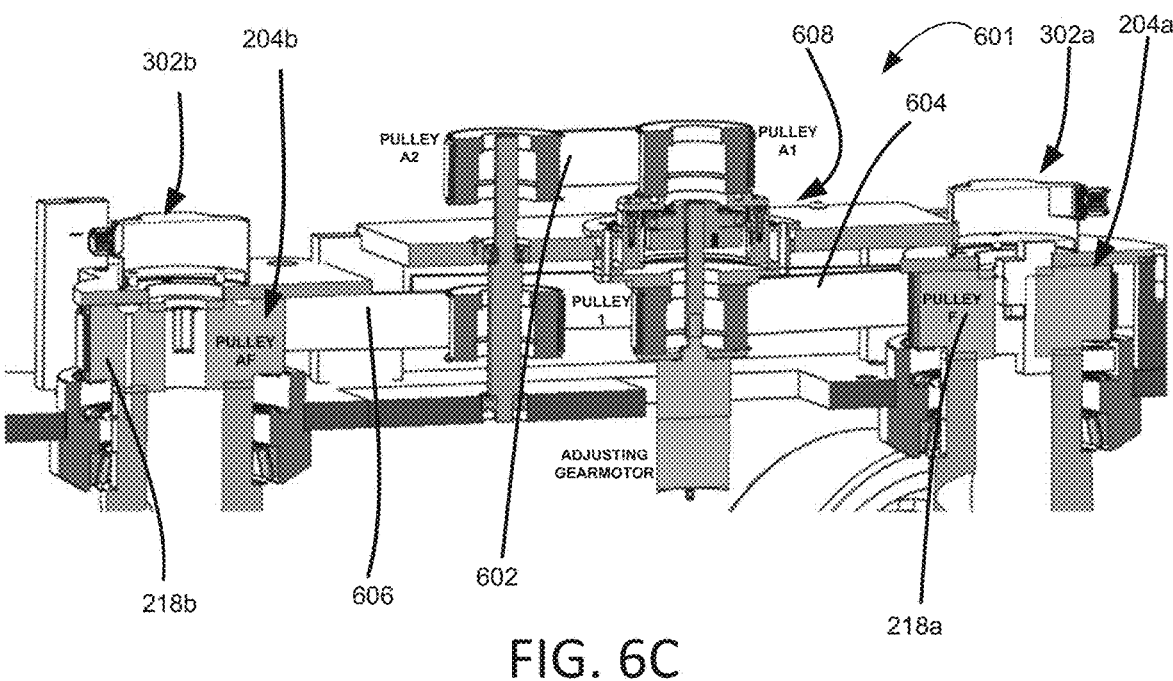
FIG. 6C is a cross-sectional view of the example displaced differential steering assembly of FIG. 6A utilizing a first rotation configuration.
Figure 6D:
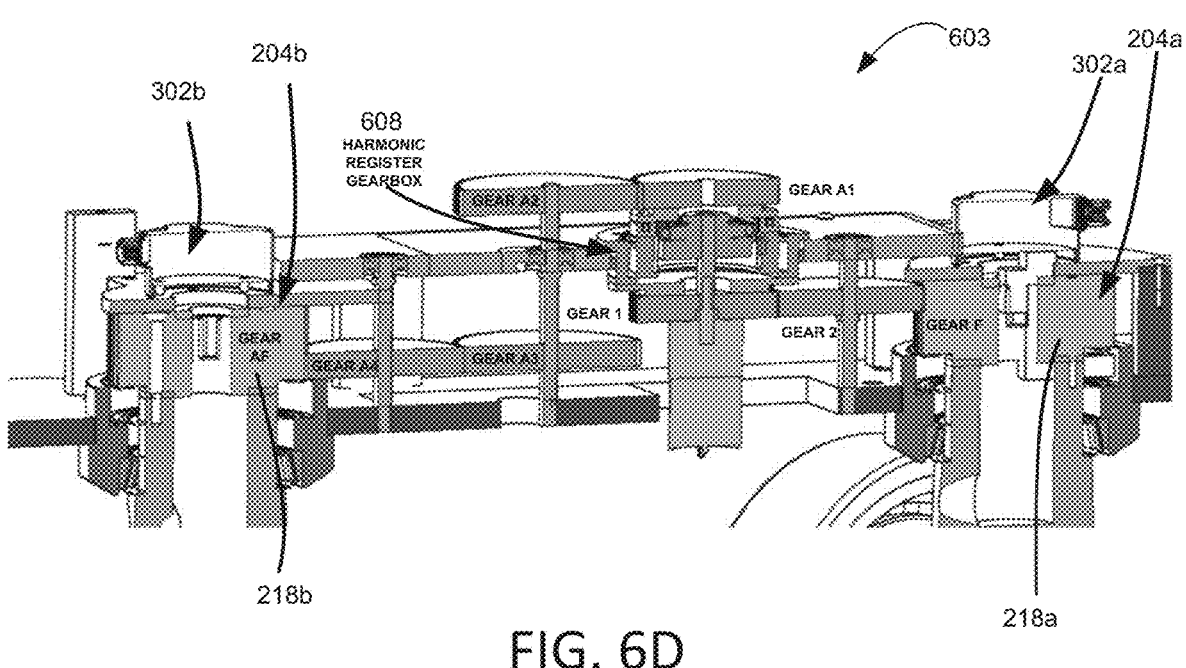
FIG. 6D is a cross-sectional view of the example displaced differential steering assembly of FIG. 6A utilizing a second rotation configuration.

FIG. 6A illustrates an isometric view of the example differential drive system 300 utilizing another example displaced differential steering assembly 600 (hereinafter "steering assembly 600"). FIG. 6B illustrates a front view of the example differential drive system 300 of FIG. 6A. FIG. 6C is a cross-sectional view of the example steering assembly 600 of FIG. 6A utilizing a first rotation configuration 601. FIG. 6D is a cross-sectional view of the example steering assembly 600 of FIG. 6A utilizing a second rotation configuration 603.

The steering assembly 600 may utilize a first rotation configuration 601 as illustrated in FIGS. 6A, 6B, and 6C or a second rotation configuration 603 as illustrated in FIG. 6D to reduce or increase the distance between respective pulleys or gears to thereby rotate pivots 204a, 204b, and in turn rotate drive wheels 202a, 202b as described herein.

For example, the first rotation configuration 601 may include belt 602 that operably couples together pulley A1 and A2, belt 604 that operably couples together pulley 1 and pulley 218a, and belt 606 that operably couples together pulley A3 and pulley 218b. Pulley A1 and pulley 1 may be operably coupled to opposite sides of an adjusting gearbox 608. The adjusting gearbox 608 may be, for example, but not limited to, a harmonic gearbox, or another type of gear reduction box. The adjusting gearbox 608 may be configured to adjust the rotational position of pulley A1 relative to pulley 1. An adjusting gearmotor is operably coupled to the adjusting gearbox 608 and is configured to rotate the adjusting gearbox 608. Based on direction of rotation of the adjusting gearbox 608, the adjusted pulley A1 is angularly offset relative to the pulley 1. That is, moving one pulley (e.g., pulley A1) relative to the other pulley (e.g., pulley 1) rotates the pulleys 218a, 218b, and in turn, drive wheels 202a, 202b, via the respective belts. As such, the drive wheels 202a, 202b may "toe-in" or "toe-out" based on the direction of rotation and an amount of adjustment made between the pulleys coupled to the adjusting gearbox 608.

In another example shown in FIG. 6D, the second rotation configuration 603 may include gears A1 and A2 operably coupled to one another, gears 1 and 2 and pulley 218a operably coupled to one another, and gears A3 and A4 and pulley 218b operably coupled to one another. Gear A1 and gear 1 may be operably coupled to opposite sides of the adjusting gearbox 608. The adjusting gearbox 608 may be configured to adjust the rotational position of gear A1 relative to gear 1. Based on direction of rotation of the adjusting gearbox 608, the adjusted gear A1 is offset relative to the gear 1. That is, the adjusting gearbox 608 is configured to adjust the rotational position of one gear relative to the other gear. When adjusting the gears, the adjusting gearbox 608 rotates gear A1 and gear 1 in the same rotational direction, however, the rotational position of one gear may be offset relative to the other gear. Moving one gear (e.g., gear A1) relative to the other gear (e.g., gear 1) rotates the pulleys 218a, 218b, and in turn, drive wheels 202a, 202b, via the operably coupled gears. For instance, as gear A1 and gear 1 rotate in a clockwise direction, gear F (and pulley 218a) rotate in an equal clockwise rotation and a gear AF (and pulley 218b) rotate in a corresponding counterclockwise rotation. The drive wheels 202a, 202b may "toe-in" or "toe-out" based on the direction of rotation and an amount of adjustment made between the pulleys coupled to the adjusting gearbox 608.

Figure 7:
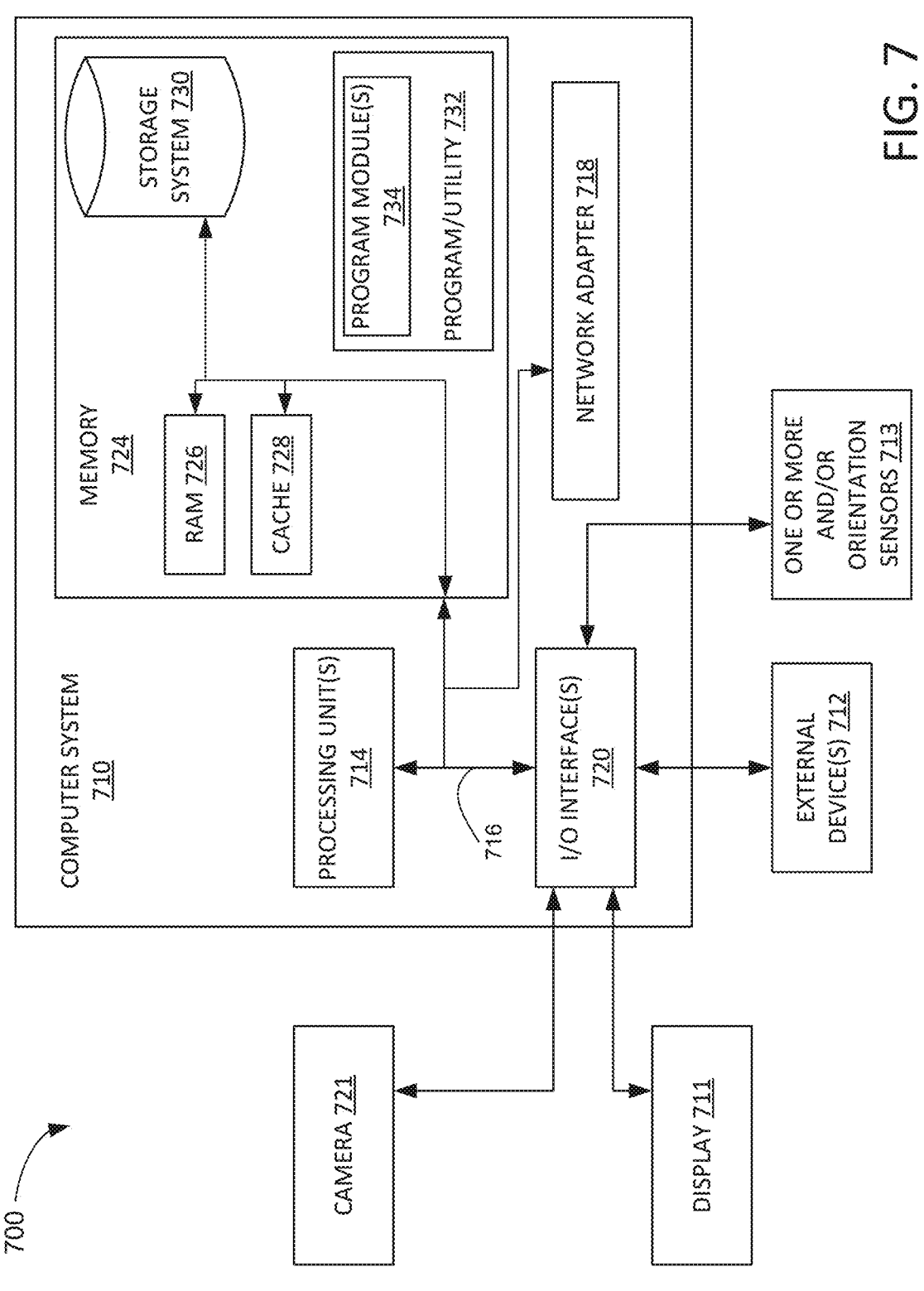
FIG. 7 is a block diagram depicting components of a data processing system.

FIG. 7 is a block diagram depicting components of a data processing system. FIG. 7 is a block diagram, generally designated 700, depicting components of computing device capable of operating, for example, the differential drive assembly 102, the displaced differential drive system 200, and the displaced differential drive system 300 in accordance with embodiments of the present disclosure. FIG. 7 provides only an illustration of one implementation and does not imply any limitations with regard to the environments in that different embodiments may be implemented. Many modifications to the depicted environment may be made.

In one or more cases, a computing system of one or more of the systems 102, 200, and 300 is shown in the form of a general-purpose computing device, such as computer system 710. The components of the computer system 710 may include, but are not limited to, one or more processors or processing unit 714, a memory 724, and a bus 716 that couples various system components including the memory 724 to the processing unit 714.

The bus 716 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system 710 typically includes a variety of computer system readable media. Such media may be any available media that is accessible by the computer system 710, and it includes both volatile and non-volatile media, removable and non-removable media.

The memory 724 can include computer system readable media in the form of volatile memory, such as random access memory (RAM) 726 and/or cache memory 728. The computer system 710 may further include other removable/ non-removable, volatile/non-volatile computer system storage media. By way of example only, the storage system 730 can be provided for reading from and writing to a non-removable, non-volatile media, for example, magnetic media (not shown and typically called a "hard drive"), and/or solid-state non-volatile media, for example flash memory. Although not shown, a magnetic disk drive for reading from and writing to a removable, non-volatile magnetic disk, a drive for reading from and writing to a removable, non-volatile solid state disk (e.g. a flash drive), and/or an optical disk drive for reading from or writing to a removable, non-volatile optical disk such as a CD-ROM, DVD-ROM, or other optical media can be provided. In such instances, each can be connected to the bus 716 by one or more data media interfaces. As will be further depicted and described below, the memory 724 may include at least one computer program product having a set (e.g., at least one) of program modules that are configured to carry out the functions of embodiments.

A program/utility 732, having one or more sets of program modules 734, may be stored in the memory 724 by way of example, and not limitation, as well as an operating system, one or more application programs, other program modules, and program data. Each of the operating systems, one or more application programs, other program modules, and program data, or some combination thereof, may include an implementation of a networking environment. The program modules 734 generally carry out the functions and/or methodologies of embodiments as described herein. The computer system 710 may also communicate with one or more external device(s) 712 such as a keyboard, a pointing device, a display 711, etc., or one or more devices that enable a user to interact with the computer system 710 and any devices (e.g., a network adapter, modem, wireless network adapter, Bluetooth adapter, etc.) that enable the computer system 710 to communicate with one or more other computing devices. Such communication can occur via Input/Output (I/O) interface(s) 720. Still yet, the computer system 710 can communicate with one or more networks such as a local area network (LAN), a general wide area network (WAN), and/or a public network (e.g., the Internet) via a network adapter 718. As depicted, the network adapter 718 communicates with the other components of the computer system 710 via the bus 716. It should be understood that although not shown, other hardware and software components, such as microcode, device drivers, redundant processing units, external disk drive arrays, RAID systems, tape drives, and data archival storage systems may be used in conjunction with the computer system 710.

The embodiments described in the present disclosure may relate to a system, a method, and/or a computer program product. The computer program product may include a computer readable storage medium (or media) having computer readable program instructions for causing a processor to carry out aspects of the embodiments. The computer system 710 also may be operably coupled to a camera 721 (e.g., a camera configured to detect lines on a floor of a warehouse facility), and one or more position and/or orientation sensors 713, such as an accelerometer, gyroscope and/or LiDAR scanning sensors.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions, cloud storage, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a non-transitory computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the embodiments may be instruction-set-architecture (ISA) instructions, machine instructions, machine dependent instructions, microcode, firmware instructions, state-setting data, or either source code or object code written in any combination of one or more programming languages, including an object oriented programming language such as C++ and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more cases, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described in the present disclosure.

Aspects of the embodiments are described herein with reference to illustrations and/or block diagrams of methods, apparatus (systems), and computer program products. It will be understood that each block of the illustrations and/or block diagrams, and combinations of functions in the illustrations and/or block diagrams, can be implemented by non-transitory computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified herein (e.g., to control an orientation of a drive wheel and/or position of a drive assembly).

The figures illustrate the architecture, functionality, and operation of possible implementations of systems, methods, and computer program products according to various embodiments. In this regard, each block in the block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may be executed substantially concurrently, the blocks may sometimes be executed in the reverse order, depending upon the functionality involved, or the blocks may sometimes be executed out of order, depending upon the functionality involved. It will also be noted that each block of the block diagrams and combinations of blocks in the block diagrams can be implemented by special purpose hardware-based systems that perform the specified functions or acts or carry out combinations of special purpose hardware and computer instructions.

The various embodiments described above are provided by way of illustration only and should not be construed to limit the claims attached hereto. Those skilled in the art will readily recognize various modifications and changes that may be made without following the example embodiments and applications illustrated and described herein, and without departing from the spirit and scope of the following claims.

What is claimed is:

1. A displaced differential drive unit, comprising:
a first drive wheel having a traction point, the first wheel being connected to a first pivot via a first drive assembly configured to rotate the first drive wheel, the first pivot having a vertical axis that is offset laterally from the first wheel traction point;
a second drive wheel having a traction point, the second wheel being connected to a second pivot via a second drive assembly configured to rotate the second drive wheel, the second pivot having a vertical axis that is offset laterally from the second wheel traction point;
a first pulley coupled to the first pivot and coaxially aligned with the first pivot vertical axis;
a second pulley coupled to the second pivot and coaxially aligned with the second pivot vertical axis;
a belt directly engaged with and connecting the first pulley and the second pulley,
wherein the first drive assembly and the second drive assembly operate independently, and
a pulley assembly engaged with the belt, wherein a position of the pulley assembly is adjustable relative to the first pulley or the second pulley.

2. The displaced differential drive unit of claim 1, further comprising an encoder operably coupled to the first pulley and coaxially aligned with the first pivot vertical axis.

3. The displaced differential drive unit of claim 1, wherein the position of the pulley assembly corresponds to an angle of orientation of the first drive wheel and a fixed idler pulley engaged with the belt.

4. The displaced differential drive unit of claim 1, wherein the first drive wheel and the second drive wheel are oriented based on an Ackermann steering configuration.

5. The displaced differential drive unit of claim 1, further comprising an encoder, coupled to one or more pulleys or directly to the belt that travels about the pulleys, that indicates the orientation of at least one drive wheel.

6. The displaced differential drive unit of claim 5, wherein the first drive wheel and the second drive wheel are rotationally mounted within a frame, the first drive wheel being on one side of the frame and the second drive wheel being on the other side of the frame.

7. The displaced differential drive unit of claim 1, wherein the first drive assembly and the second drive assembly each comprise an electric motor and gearbox configured to independently rotate the respective first drive wheel and second drive wheel at the same speed or different speeds.

8. The displaced differential drive unit of claim 7, wherein differential steering is achieved by driving one drive wheel faster than the other drive wheel, and being connected together by the belt, both drive wheels steer in the same direction and by the same amount, maintaining the same angular offset.

9. An adjustable differential drive unit, comprising:
a first drive wheel having a traction point, the first wheel being connected to a first pivot having a vertical axis that is offset laterally from the first wheel traction point;
a second drive wheel having a traction point, the second wheel being connected to a second pivot having a vertical axis that is offset laterally from the second wheel traction point;
a first pulley coupled to the first pivot and coaxially aligned with the first pivot vertical axis;
a second pulley coupled to the second pivot and coaxially aligned with the second pivot vertical axis;
a third pulley, wherein the position of the third pulley relative to the first pulley or second pulley is adjustable; and
a belt engaged with and connecting the first pulley, the second pulley and the third pulley.

10. The adjustable differential drive unit of claim 9, further comprising a fourth pulley, wherein the position of the fourth pulley relative to the first pulley or second pulley is adjustable, and wherein the belt is engaged with and connects the first pulley, the second pulley, the third pulley, and the fourth pulley.

11. The adjustable differential drive unit of claim 10, further comprising an encoder operably coupled to the first pulley and coaxially aligned with the first pivot vertical axis.

12. The adjustable differential drive unit of claim 10, further comprising a frame, wherein the first drive wheel and the second drive wheel are positioned on a first side of the frame, and wherein the first pulley and the second pulley are positioned on a second side of the frame.

13. The adjustable differential drive unit of claim 10, wherein a tensioner is coupled to one of the third pulley or the fourth pulley, and wherein the tensioner is configured to adjust distance between the third pulley and the fourth pulley.

14. The adjustable differential drive unit of claim 10, wherein the third pulley and the fourth pulley are coupled to an actuator configured to position the third pulley and the fourth pulley between the first pulley and the second pulley.

15. The adjustable differential drive unit of claim 10, further comprising a computing platform configured to control a rotational movement and an orientation of the respective first drive wheel and the second drive wheel based on at least encoder information.

16. The adjustable differential drive unit of claim 9, wherein the first drive wheel and the second drive wheel are coupled to a frame and orientated to move the frame in a linear direction, wherein first and second encoders are respectively coupled to the first drive wheel and the second drive wheel and indicate the same angle of orientation for the first drive wheel and the second drive wheel.

17. The adjustable differential drive unit of claim 9, wherein the first drive wheel and the second drive wheel are coupled to a frame and orientated to move the frame in a rotational direction, wherein a first encoder is coupled to the first drive wheel and indicates a first angle of orientation of the first drive wheel and a second encoder is coupled to the second drive wheel and indicates a second angle of orientation of the second drive wheel.

18. An adjustable differential drive unit, comprising:

a first drive wheel having a traction point, the first wheel being connected to a first pivot having a vertical axis that is offset laterally from the first wheel traction point;

a second drive wheel having a traction point, the second wheel being connected to a second pivot having a vertical axis that is offset laterally from the second wheel traction point;

a first pulley coupled to the first pivot and coaxially aligned with the first pivot vertical axis;

a second pulley coupled to the second pivot and coaxially aligned with the second pivot vertical axis;

a third and fourth pulley, wherein the position of the third and fourth pulleys can be moved relative to the first and second pulleys; and a belt engaged with and connecting the first, second, third and fourth pulleys.

19. The displaced differential drive unit of claim 18, further comprising an actuator that can move the second and third pulleys together, in one direction or the other, to adjust the angular orientation of one drive wheel as compared to the other drive wheel.

20. The displaced differential drive unit of claim 19, wherein the third and fourth pulleys, the sliding assembly upon which they are mounted and the actuator that moves them together comprise a steering offset adjusting system.

21. The displaced differential drive unit of claim 20, wherein the first drive wheel and the second drive wheel can be rotated at different speeds, causing steering, while simultaneously the steering offset adjusting system can be actuated, together resulting in the possibility of providing various driving functionalities.

22. The displaced differential drive unit of claim 21, wherein one of these functionalities can be Ackermann steering.

23. The displaced differential drive unit of claim 21, wherein one of these functionalities can be steerable lateral travel.

24. The displaced differential drive unit of claim 21, wherein one of these functionalities can be to rotate the machine about a fixed point or vertical axis.

\* \* \* \* \*